United States Patent [19]
Watanabe

[11] Patent Number: 5,990,471
[45] Date of Patent: Nov. 23, 1999

[54] MOTION DETECTION SOLID-STATE IMAGING DEVICE

[75] Inventor: Takashi Watanabe, Soraku-gun, Japan

[73] Assignee: Sharp Kabushiki Kaisha, Osaka, Japan

[21] Appl. No.: 09/006,613

[22] Filed: Jan. 13, 1998

[30] Foreign Application Priority Data

Feb. 17, 1997 [JP] Japan .................................. 9-032460
Jun. 20, 1997 [JP] Japan .................................. 9-164825

[51] Int. Cl.$^6$ .................................................. H01L 27/00
[52] U.S. Cl. ........................................ 250/208.1; 348/220
[58] Field of Search ........................ 250/208.1; 348/208, 348/220; 358/906; 386/121

[56] References Cited

U.S. PATENT DOCUMENTS 4,901,143  2/1990  Uehara et al. ........................ 348/220

OTHER PUBLICATIONS

B. Ackland, et al., IEEE International Solid–State Circuits Conference TA 1.2 (1996), pp. 22–25.
A. Dickinson, et al., IEEE International Solid–State Circuits Conference TP 13.5 (1995), pp. 180–181, 226–227.

*Primary Examiner*—Stephone Allen
*Attorney, Agent, or Firm*—Dike, Bronstein, Roberts & Cushman, LLP; David G. Conlin

[57] ABSTRACT

A motion detection solid-state imaging device of the present invention includes a plurality of photoelectric converters arranged in a matrix to form a receiving field, the device detecting motion of an image based on signals from the photoelectric converters. First and second photoelectrics of the plurality of photoelectric converters which are spatially adjacent to each other are treated as a set. A first light integration period of the first photoelectric converter is shorter than a second light integration period of the second photoelectric converter, while the first and second light integration periods end substantially at a same point of time. The signals from the first and second photoelectric converters are both read out after the first and second light integration periods. A product of a ratio of the second light integration period with respect to the first light integration period and the signal from the first photoelectric converter is obtained so as to detect motion of the image based on a difference between the product and a signal from the second photoelectric converter.

16 Claims, 16 Drawing Sheets

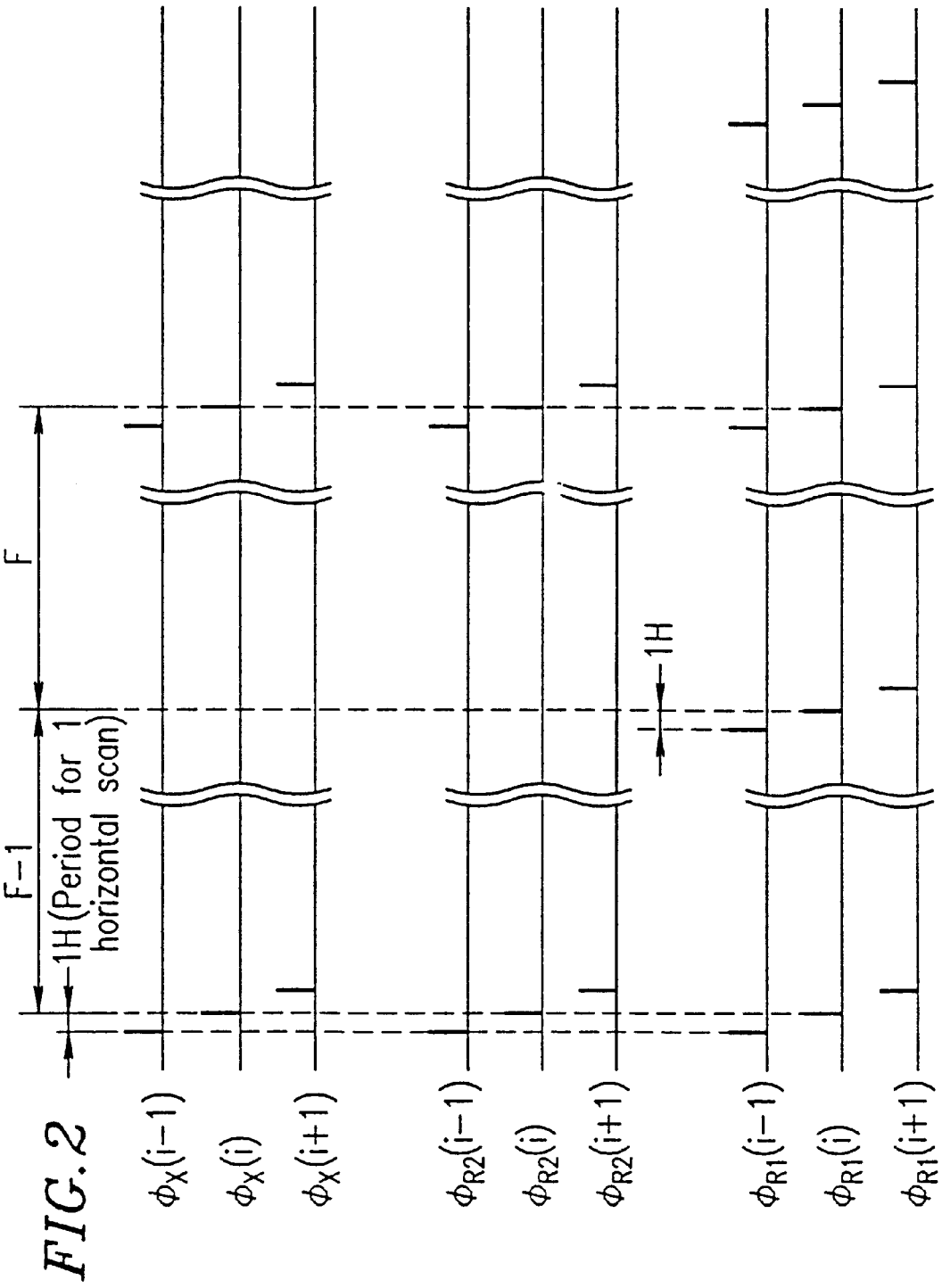

MOTION DETECTION SOLID-STATE IMAGING DEVICE

BACKGROUND OF THE INVENTION

1. Field of the Invention

The present invention relates to a motion detection solid-state imaging device for detecting motion of an image.

2. Description of the Related Art

Among conventional solid-state imaging devices, those of the charge coupled device (CCD) type are dominant and are widely used in various fields. In a CCD type imaging device, light is photoelectrically converted by a pixel such as a photodiode or a MOS diode. The stored signal charge is guided to a highly sensitive charge detection section via a CCD transmission channel, where it is converted into a voltage signal. The advantages thereof are, for example, a high S/N ratio and a high output voltage.

Moreover, a MOS type imaging device reads out signals from pixels by an X-Y address type scanning circuit. Such devices include those of a non-amplifying type which directly read out a signal charge of a pixel and those of an amplifying type which do not read out the signal charge itself but read out the signal charge after being amplified in the pixel.

FIG. 10 shows a pixel of the non-amplifying type solid-state imaging device. In the figure, a photodiode 91 photoelectrically converts incident light and stores the signal charge. A transistor 92 is turned on in response to a pulse signal $\Phi_X$ from a scanning circuit and transmits the signal charge of the photodiode 91 and outputs a signal voltage $V_{sig}$. Since the signal charge of the photodiode 91 is drained via the transmission and readout operations, the pulse signal $\Phi_X$ effects both readout and reset operations of the signal charge.

In such a non-amplifying type solid-state imaging device, since the amount of signal charge is small, it is easily influenced by parasitic capacitance of a readout line, whereby the influence of a noise during a readout operation is significant.

On the other hand, in the amplifying type solid-state imaging device, since the signal charge is read out after being amplified in a pixel, the influence of noise during a readout operation is substantially negligible, thereby being more advantageous than those of the non-amplifying type in view of the S/N ratio. Moreover, there is no limit on the amount of signal charge to be read out from a pixel, whereby the device of this type is more advantageous than a non-amplifying type solid-state imaging device in terms of dynamic range. Furthermore, as will be described later, it is required only to drive horizontal and vertical signal lines, with the driving voltage being low, whereby the power consumption is less than that of a non-amplifying type solid-state imaging device.

Each pixel in such an amplifying type solid-state imaging device includes a photoelectric conversion section for generating a signal charge according to incident light and an amplification section for converting the signal charge from the photoelectric conversion section to a signal voltage and amplifying it. The pixels can be classified into those of a lateral type where the photoelectric conversion section and the amplification section are provided in a planar arrangement and those of a vertical type where they are provided in a three-dimensional arrangement.

As an example of the lateral type pixel, those of an APS type, as shown in FIG. 11, are known (see B. Ackland, et al., "Camera on Chips", ISSCC'96, pp. 22 to 25, February 1996).

In the figure, a signal charge generated in a photoelectric conversion section 101 is transferred to a gate of a transistor 102 so as to be an input voltage of the transistor 102. The transistor 102 is provided for impedance conversion and performs current amplification of a signal. The output of the transistor 102 is read out as a signal voltage $V_{sig}$ via a pixel selection transistor 103. During a drainage period after a readout operation, a reset transistor 104 is turned on so as to drain a signal charge stored in the gate of the transistor 102 to a drain $V_D$.

As an example of a vertical type pixel, those of a CMD type, as shown in FIG. 12, are known (see Nakamura, et al., "Gate-stored MOS Phototransistor Image Sensor", Transaction of the Institute of Television Engineers of Japan, vol. 41, No. 11, pp. 1047 to 1053, 1987).

In such a pixel, an initial voltage is applied to the gate of a transistor 111, and a signal charge generated through photoelectric conversion is stored in the gate. During a readout period, a pulse signal $\Phi_X$ is applied to the gate of the transistor 111 so as to read out a signal voltage $V_{sig}$ of the transistor 111. During a drainage period, a pulse signal $\Phi_R$ greater than the voltage $\Phi_X$ is applied to the gate of the transistor 111 so as to drain the signal charge of the gate to a substrate (not shown). Therefore, all of these operations: photoelectric conversion, signal charge amplification and pixel selection are performed by the transistor 111.

However, the use of this pixel requires three different voltages to be selectively applied to the gate of the transistor 111, where at least one of the three different voltages is a high voltage.

In view of this, as an invention separate from the present invention, the applicant of the present invention has applied for a patent application on a pixel (Japanese Laid-Open Publication No. 8-78653), which can be driven by a low voltage. In this case, as shown in FIG. 13, a signal charge is stored in the gate of a transistor 121, to which gate a pulse signal $\Phi_X$ is applied so as to read out a signal voltage $V_{sig}$. During a drainage period, a pulse signal $\Phi_R$ is applied to a transistor 122 so as to drain the signal charge to a substrate (represented by a ground symbol in the figure). Voltages $\Phi_X$ and $\Phi_R$ can both be made low. Thus, the pixel can be driven by two low voltages.

The respective configurations of the pixels illustrated in FIGS. 11 to 13 may be represented commonly by a schematic diagram such as one shown in FIG. 14. A photoelectric conversion section 131 not only performs photoelectric conversion but also outputs a signal voltage in response to a pulse signal $\Phi_X$ and drains a signal charge in response to a pulse signal $\Phi_R$. An amplification section 132, when receiving a signal charge, amplifies the signal charge and outputs a signal voltage $V_{sig}$.

A plurality of pixels having such a configuration are arranged in a matrix so as to form an imaging screen of a solid-state imaging device. A signal voltage of each pixel is obtained according to an image on the receiving field, and signal voltages obtained for the pixels are used as image signals. Moreover, a light integration period of each pixel is defined from a reset operation for emptying the signal charge of the pixel to a readout operation for reading out a signal charge stored in the pixel through the photoelectric conversion. The reset operation and the readout operation may coincide with each other in some cases.

A solid-state imaging device is not only used for imaging an image, but also used for detecting motion of an image on a receiving field of the solid-state imaging device. For example, a fixed scene can be continuously imaged so as to detect a human, or the like, entering the scene. In response to the entry of the human, various equipments can be controlled, or the entry itself can be notified or recorded.

In order to detect such motion of the image on the receiving field, a device such as that shown in FIG. 15 has been proposed.

In this device, in each of frame periods (F−1), F, (F+1), . . . , shown in FIG. 16, an image signal 144 for the frame period is output from a solid-state imaging device 141. The image signal 144 for the frame period is stored in a frame memory 142 and output to a differential amplifier 143. Moreover, the frame memory 142 stores the image signal 144 for the frame period and outputs an image signal 145 of the previous frame period to the differential amplifier 143. The differential amplifier 143 obtains and outputs the difference between the image signals 144 and 145 of the consecutive frame periods.

The calculation by the differential amplifier 143 is performed by each pixel. That is, a signal voltage of a pixel at one pixel address, e.g., ($i_{th}$ row, $j^{th}$ column), is obtained for each of the two consecutive frame periods so as to obtain the difference in signal voltages between these frame periods.

For example, if there is no change in the image on the receiving field over the consecutive frame periods (F−1) and (F), a signal voltage of a pixel does not change over the frame periods (F−1) and (F), whereby the difference between the signal voltages of the respective frame periods is zero. On the other hand, if there is some change in the image on the receiving field over the consecutive frame periods (F−1) and (F), as shown in FIG. 17, whereby the signal voltage of a pixel 146 at the pixel address (i, j) changes over the frame periods, then, the difference between the signal voltages of the respective frame periods is not zero.

Therefore, only when the image on the receiving field changes, (i.e., the difference between the signal voltages of the respective frame periods is not zero) does the output of the differential amplifier 143 vary. Thus, motion of the image on the receiving field can be detected.

However, in such a device, if a frame memory 142 stores analog signals, it is necessary to match the gain and linearity of the signal voltage output from the frame memory 142 to those of the signal voltage output from the solid-state imaging device 141. It is also necessary to sufficiently suppress the noise level. Consequently, it is extremely difficult to realize such a device. On the other hand, if a frame memory 142 stores digital signals, it is necessary to effectuate A/D conversion upon the signal voltage output from the solid-state imaging device 141 to obtain a digital signal, store the digital signal in the frame memory 142, and effectuate D/A conversion upon the digital signal output from the frame memory 142 to obtain an analog signal voltage. Thus, since it is necessary to provide an A/D convertor and a D/A convertor, the circuit scale increases, whereby some cost increase is unavoidable.

FIG. 18 illustrates another device for detecting motion of an image on a receiving field (see A. Dickinson, et al., "A 256×256 CMOS Active Pixel Image Sensor with Motion Detection", ISSCC95, p.226–227, February 1995).

In this case, a plurality of pixels 151 are arranged in a matrix, and a column amplifier 152 is provided for each of the vertical columns of the arrangement of the pixels 151. For each horizontal row, signal voltages of the pixels 151 in a row are transmitted to the respective column amplifiers 152. The outputs of these column amplifiers 152 are sequentially transmitted to a differential amplifier 153.

Each pixel 151 is configured as illustrated in FIG. 19, where a signal charge generated by a photoelectric conversion element 154 is stored in a capacitor $C_P$. A charge transmission transistor 155 is applied with a pulse signal $\Phi_T$ in the gate thereof and is thus turned on so as to transmit the signal charge to a capacitor $C_S$. The gate of an amplification transistor 156 is applied with a voltage across the capacitor $C_S$ so as to output a signal voltage $V_{sig}$ according to the signal charge of the capacitor $C_S$, from the amplification transistor 156. A selection transistor 157 is applied with a pulse signal $\Phi_V$ in the gate thereof and is thus turned on so as to output the signal voltage $V_{sig}$ of the amplification transistor 156 to the column amplifier 152. A reset transistor 158 is applied with a pulse signal $\Phi_R$ in the gate thereof and is thus turned on so as to drain the signal charge of the capacitor $C_S$ to a drain $V_D$.

In the column amplifier 152, on the other hand, pulse signals $\Phi_{sA}$ and $\Phi_{sB}$ are applied at respective timings to the gates of the respective selection transistors 161 and 162 so as to turn on the selection transistors 161 and 162, thereby transmitting the signal voltage $V_{sig}$ from the pixel 151, via the respective selection transistors 161 and 162, to the respective capacitors $C_A$ and $C_B$, where the signal voltages $V_{sig}$ are stored. At the same time, a pulse signal $\Phi_H$ is applied to each of the gates of transistors 163 and 164 so as to turn on these transistors 163 and 164, thereby sending the signal voltages $V_{sig}$ respectively stored in the capacitors $C_A$ and $C_B$ to a differential amplifier 167 via amplifiers 165 and 166, respectively.

The differential amplifier 167 obtains and outputs the difference between the signal voltages $V_{sig}$ respectively stored in the capacitors $C_A$ and $C_B$.

FIG. 20 shows the respective timings of signals used in such a device. In this case, the duration of a frame period varies for different horizontal rows. The $i^{th}$ row will be discussed below.

As is apparent from the timing diagram, in the pixel 151, immediately before the end of the frame period (F−1) (when the signal charge for the frame period (F−1) is still being stored in the capacitor $C_S$), a pulse signal $\Phi_V$ is activated so as to turn on the selection transistor 157, thereby outputting the signal voltage $V_{sig}$ (signal voltage 171 in FIGS. 19 and 20) for the frame period (F−1) to the column amplifier 152 via the selection transistor 157.

In the column amplifier 152, immediately before the end of the frame period (F−1), a pulse signal $\Phi_{sB}$ is activated so as to turn on the selection transistor 162, thereby transmitting the signal voltage $V_{sig}$ (signal voltage 173 in FIGS. 19 and 20) from the pixel 151 for the frame period (F−1), via the selection transistor 162, to the capacitor $C_B$, where the signal voltage $V_{sig}$ is stored.

Then, in the pixel 151, a pulse signal $\Phi_R$ is activated so as to turn on a reset transistor 158, thereby draining the signal charge of the capacitor $C_S$ to the drain $V_D$ via the reset transistor 158, thus eliminating the signal voltage $V_{sig}$ for the frame period (F−1). Moreover, a pulse signal $\Phi_T$ is activated so as to turn on the charge transmission transistor 155, thereby transmitting the signal charge which has been stored in the capacitor $C_P$ since the beginning of the frame period F to the capacitor $C_S$ via the charge transmission transistor 155. Thus, the signal voltage $V_{sig}$ (signal voltage 171 in FIGS. 19 and 20) for the frame period F is output from the amplification transistor 156.

Next, in the column amplifier 152, a pulse signal $\Phi_{sA}$ activated so as to turn on the selection transistor 161, thereby transmitting the signal voltage $V_{sig}$ (signal voltage 172 in FIGS. 19 and 20) from the pixel 151 for the frame period F, via the selection transistor 161, to the capacitor $C_A$, where the signal voltage $V_{sig}$ is stored.

Immediately after this, a pulse signal $\Phi_H$ is activated so as to turn on the transistors 163 and 164, thereby sending the signal voltages $V_{sig}$ (signal voltages 172 and 173 in FIGS. 19 and 20) stored in the respective capacitors $C_A$ and $C_B$ to the differential amplifier 167.

The differential amplifier 167 obtains and outputs the difference between the signal voltage $V_{sig}$ stored in the capacitor $C_B$ for the frame period (F-1) and the signal voltage $V_{sig}$ stored in the capacitor $C_A$ for the frame period F.

That is, immediately before the end of the frame period (F-1), the signal voltage $V_{sig}$ for the frame period (F-1) is transmitted from the pixel 151 to the column amplifier 152 so as to store the signal voltage $V_{sig}$ for the frame period (F-1) in the column amplifier 152. Subsequently, after the beginning of the frame period F, the signal voltage $V_{sig}$ for the frame period F is transmitted from the pixel 151 to the column amplifier 152 so as to store the signal voltage $V_{sig}$ for the frame period F in the column amplifier 152, and the difference between the signal voltages $V_{sig}$ for the respective frame periods (F-1) and F is obtained by the differential amplifier 167.

At this point, if the image on the receiving field is stationary, there is no change in the level of light incident upon the pixel 151 over the frame periods (F-1) and F, whereby the difference between the signal voltages $V_{sig}$ of the respective frame periods (F-1) and F is zero. On the other hand, if the image moves, the level of light incident upon the pixel 151 changes over the frame periods (F-1) and F, whereby there is some difference between the signal voltages $V_{sig}$ of the respective frame periods (F-1) and F. Therefore, it is possible to detect motion of the image on the receiving field based on the difference.

Such a transmission operation of the signal voltages $V_{sig}$ of the respective frame periods (F-1) and F from the pixel 151 to the column amplifier 152 and an output operation of the difference between the signal voltages $V_{sig}$ are performed for each of the pixels 151 in one horizontal row, and are repeated for each of the rows (i-1), i and (i+1).

However, the solid-state imaging device requires two capacitors $C_P$ and $C_S$ for storing two signal charges and a charge transmission transistor 155 between the capacitors $C_P$ and $C_S$ to be provided therein. Thus, the size of each pixel 151 increases.

As described above, in the conventional device shown in FIG. 15, if a frame memory 142 stores analog signals, it is necessary to match the gain and linearity of the signal voltage output from the frame memory 142 to those of the signal voltage output from the solid-state imaging device 141. It is also necessary to sufficiently suppress the noise level. Therefore, it is extremely difficult to realize such a device. On the other hand, if a frame memory 142 stores digital signals, since it is necessary to provide an A/D convertor and a D/A convertor, the circuit scale increases, whereby some cost increase is unavoidable.

Moreover, the other conventional devices shown in FIG. 18 require two capacitors $C_P$ and $C_S$ and a charge transmission transistor 155 to be provided therein. As a result, the size of each pixel 151 increases.

SUMMARY OF THE INVENTION

According to one aspect of this invention, a motion detection solid-state imaging device of the present invention includes a plurality of photoelectric converters arranged in a matrix to form a receiving field, the device detecting motion of an image based on signals from the photoelectric converters. First and second photoelectrics of the plurality of photoelectric converters which are spatially adjacent to each other are treated as a set. A first light integration period of the first photoelectric converter is shorter than a second light integration period of the second photoelectric converter, while the first and second light integration periods end substantially at a same point of time. The signals from the first and second photoelectric converters are both read out after the first and second light integration periods. A product of a ratio of the second light integration period with respect to the first light integration period and the signal from the first photoelectric converter is obtained so as to detect motion of the image based on a difference between the product and a signal from the second photoelectric converter.

In one embodiment of the invention, the first light integration period is about ½ of the second light integration period, and the ratio of the second light integration period with respect to the first light integration period is about 2. Motion of the image on the receiving field is detected based on a difference between the signal from the first photoelectric converter being approximately doubled and the signal from the second photoelectric converter.

In this invention, the first and second photoelectric converters which are spatially adjacent to each other are treated as a set (i.e., a single sensing unit). A charge in the signal of the first and second photoelectric converters over two consecutive frame periods is considered as an indication that the image on the receiving field has moved.

For example, when the second light integration period is set to correspond to two consecutive frame periods while setting the first light integration period to correspond to the latter frame period, the second photoelectric converter keeps integrating incident light for the consecutive two frame periods and outputs a signal which corresponds to the amount of the integrated light. On the other hand, the first photoelectric converter integrates incident light only for the latter frame period and outputs a signal which corresponds to the amount of the integrated light.

Thus, in the case where the image on the receiving field is stationary, whereby the amount of light being incident upon the respective first and second photoelectric converters (which are treated as a single pixel) remains unchanged over the consecutive two frame periods and if the signals are read out from the respective first and second photoelectric converters after the two frame periods, the level of the signal from the second photoelectric converter is twice as high as the level of the signal from the first photoelectric converter. Therefore, the difference between the signal from the first photoelectric converter being doubled and the signal from the second photoelectric converter is zero.

On the other hand, in the case where the image on the receiving field has moved, whereby there is some difference in the amount of light being incident upon the respective first and second photoelectric converters over the consecutive two frame periods, if the signals are read out from the respective first and second photoelectric converters after the two frame periods, the level of the signal from the second photoelectric converter is not twice as high as the level of the signal from the first photoelectric converter. Therefore, there is some difference between the signal from the first photoelectric converter being doubled and the signal from the second photoelectric converter.

Therefore, it is possible to detect motion of the image on the receiving field for each two frame periods based on the difference between the signal from the first photoelectric converter being doubled and the signal from the second photoelectric converter.

In comparison between the device of the present invention and an aforementioned conventional device, the conventional device requires the signal of the previous frame period to be stored or held in order to obtain the difference between signals of consecutive two frame periods. On the other hand, the device of the present invention performs light integration by the second photoelectric converter for two consecutive frame periods, while performing light integration by the first photoelectric converter only for the latter frame period, and obtains the difference between the signal from the first photoelectric converter being doubled and the signal from the second photoelectric converter. Thus, the device of the present invention neither requires an external memory nor two different signal charges to be stored in a pixel.

In another embodiment of the invention, the photoelectric converters arranged in a matrix are divided into sets each including first and second photoelectric converters. The first and second light integration periods are set individually for each of the sets.

In still another embodiment of the invention, the first and second light integration periods are initiated by resetting the first and second photoelectric converters and are terminated by reading out the signals of the first and second photoelectric converters. The reset and readout operations are performed for each horizontal row of the photoelectric converters arranged in a matrix.

In still another embodiment of the invention, for each horizontal row of the photoelectric converters arranged in a matrix, signals are read out and performed by a common readout section. The first photoelectric converters of the horizontally arranged photoelectric converters are reset by a first reset section, while second photoelectric converters of the horizontally arranged photoelectric converters are reset by a second reset section.

In still another embodiment of the invention, at least one of the plurality of photoelectric converter performs photoelectric conversion and signal storage.

In still another embodiment of the invention, at least one of the plurality of photoelectric converter performs photoelectric conversion, signal storage and signal amplification.

In still another embodiment of the invention, the device further includes a correlated double sampling section for compensating the signal from at least one of the plurality of photoelectric converter by subtracting, from the signal read out from at least one photoelectric converter, an output of at least one photoelectric converter after draining a charge from at least one photoelectric converter. In this case, by using the difference therebetween as a signal voltage, it is possible to eliminate an influence of the variation of the threshold value or the conductance of the transistors in the pixels. Therefore, it is possible to suppress the fixed pattern noise due to such variation.

In still another embodiment of the invention, an optical low-pass filter is provided on the receiving field, the filter having a separation width which corresponds to a separation distance between one set of the first and second photoelectric converters. In this case, the displacement between the first and second photoelectric converters and the first and second pixels is cancelled, thereby improving the precision in detecting motion of the image on the receiving field.

According to another aspect of this invention, a motion detection solid-state imaging device includes: a plurality of photoelectric converters arranged in a matrix to form a receiving field; and vertical CCDs provided along each column of the matrix arrangement, signal charges of the photoelectric converters in the column being transmitted and taken out through the vertical CCD of the column by resetting the photoelectric converters arranged in columns. A first photoelectric converter and a second photoelectric converter are alternately arranged for each column of the matrix arrangement so as to form the column. The first photoelectric converter is reset during a second light integration period of the second photoelectric converter so as to initiate a first light integration period of the first photoelectric converter, with the second light integration period of the second photoelectric converter being continued, and the first and second photoelectric converters are both reset at the end of the first and second light integration periods so as to take out the signal charges of the first and second photoelectric converters through the vertical CCD. A product of a ratio of the second light integration period with respect to the first light integration period and a signal charge of the first photoelectric converter is obtained so as to detect motion of the image based on a difference between the product and a signal charge from the second photoelectric converter.

In this case, motion of the image is detected by a solid-state imaging device using a CCD. The first and second photoelectric converters in one column are used as a single sensing unit. The device obtains the product of the ratio of the second light integration period with respect to the first light integration period and the signal charge of the first photoelectric converter. A difference between the product and the signal charge of the second photoelectric converter is considered as an indication that the image on the receiving field has moved.

In one embodiment of the invention, the device further includes a first horizontal CCD and a second horizontal CCD. Signal charges of the first and second photoelectric converters are transmitted to the first and second horizontal CCDs for each column through the vertical CCD of the column; a signal charge of the first photoelectric converter is taken out through the first horizontal CCD; and a signal charge of the second photoelectric converter is taken out through the second horizontal CCD.

In this case, motion of the image on the receiving field is detected based on the signal charge of the first photoelectric converter taken from the first horizontal CCD and the signal charge of the second photoelectric converter taken from the second horizontal CCD.

In another embodiment of the invention, the device further includes a horizontal CCD. Signal charges of the first and second photoelectric converters are transmitted to the horizontal CCD for each column through the vertical CCD of the column; the signal charges of the first and second photoelectric converters are transmitted alternately through the horizontal CCD; and the signal charges of the first and second photoelectric converters are synchronously taken out by retarding at least one of the signal charges of the first and second photoelectric converters.

In still another embodiment of the invention, when a brightness of an image on the receiving field varies periodically, the first light integration period of the first photoelectric converter is set to a multiple of the period of brightness variation of the image on the receiving field. In this case, the first light integration period of the first photoelectric converter is synchronized with periodic variation of the brightness of the image and includes a plurality of consecutive periods of brightness variation. Accordingly, the second light integration period of the second photoelectric converter is also synchronized with periodic variation of the brightness of the image and includes a plurality of consecutive periods of brightness variation. Therefore, when the difference between the signal from the first photoelectric converter being doubled and the signal from the second photoelectric converter is obtained, the periodic variation of the brightness of the image is negated out so that only the change due to the motion of the image on the receiving field is represented by the difference.

In still another embodiment of the invention, when a brightness of an image on the receiving field varies periodically, the first light integration period of the first photoelectric converter is set to a multiple of the period of brightness variation of the image on the receiving field. In this case, the first and second photoelectric converters are treated as a single pixel only when detecting motion of the image on the receiving field, while the photoelectric converters are treated as individual pixels when imaging the image on the receiving field.

In still another embodiment of the invention, wherein a detection signal indicating that motion of an image on the receiving field is detected and a signal of each photoelectric converter indicating the image on the receiving field are switchably output.

In still another embodiment of the invention, a detection signal indicating that motion of an image on the receiving field is detected and a signal of each photoelectric converter indicating the image on the receiving field are switchably output.

Thus, the invention described herein provides for a motion detection solid-state imaging device which neither requires an external memory nor two different signal charges to be stored in a pixel, whereby the size of the pixel can be made small.

This and other advantages of the present invention will become apparent to those skilled in the art upon reading and understanding the following detailed description with reference to the accompanying figures.

BRIEF DESCRIPTION OF THE DRAWINGS

FIG. 2 is a timing diagram showing timings of the signals used in the device of FIG. 1.

DESCRIPTION OF THE PREFERRED EMBODIMENTS

Hereinafter, the present invention will be described by way of illustrative examples with reference to the accompanying figures.

Figure 1:
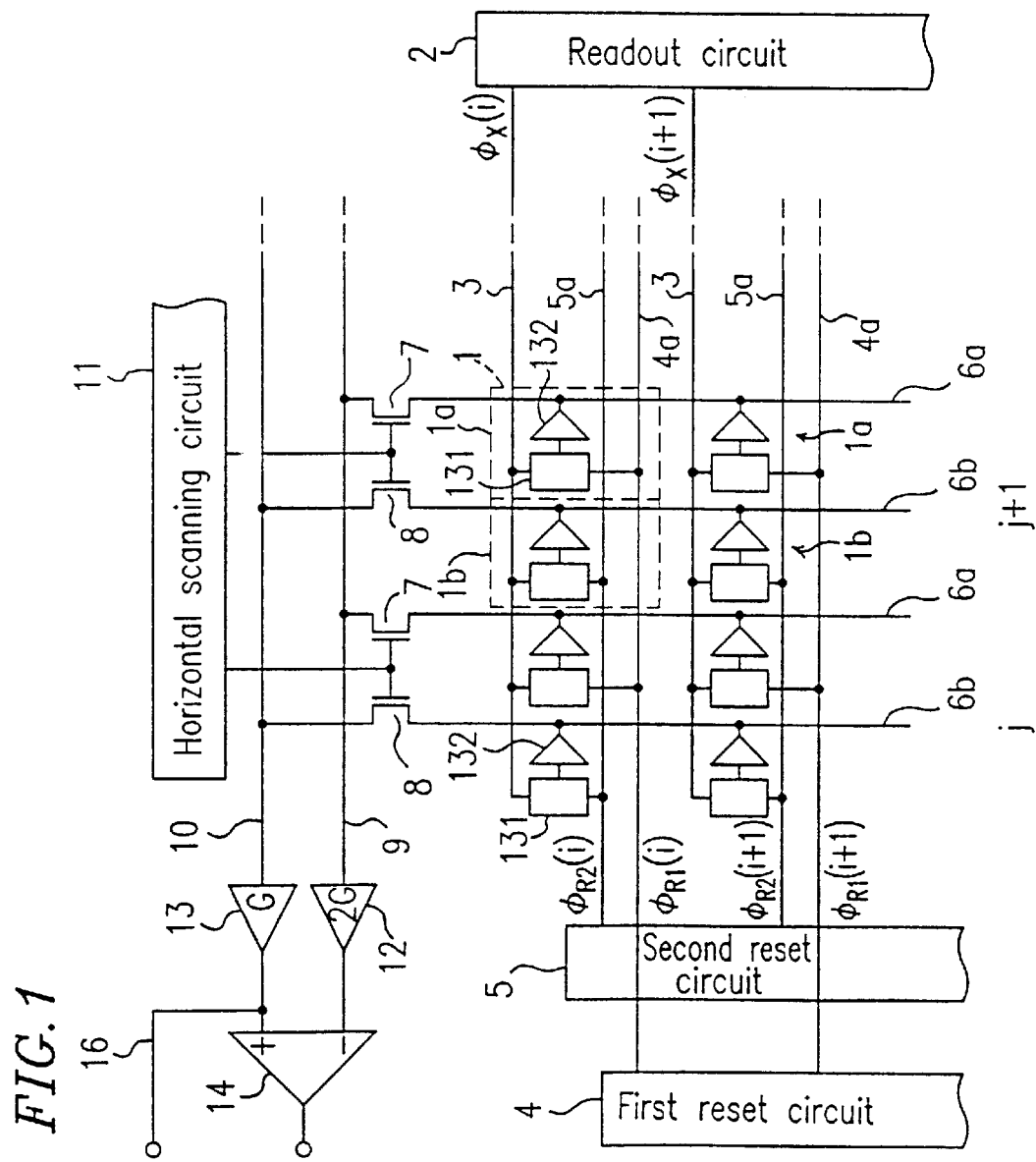
FIG. 1 is a block diagram showing a solid-state imaging device according to Example 1 of the present invention.
Figure 11:
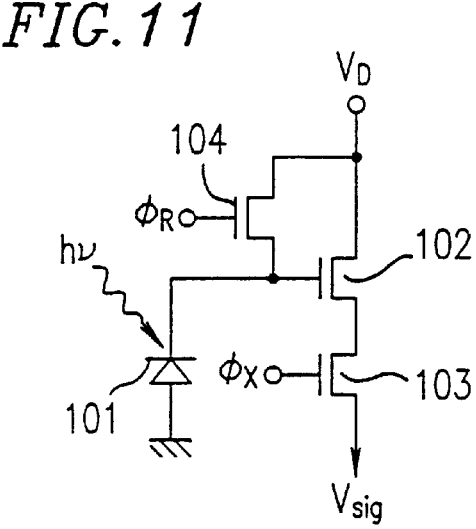
FIG. 11 is a circuit diagram showing an example of a lateral type pixel of an amplifying type solid-state imaging device.
Figure 12:
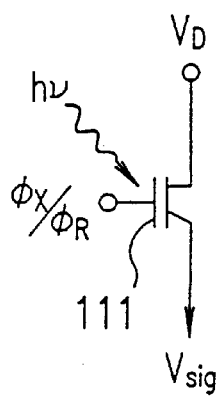
FIG. 12 is a circuit diagram showing an example of a vertical type pixel of an amplifying type solid-state imaging device.
Figure 13:
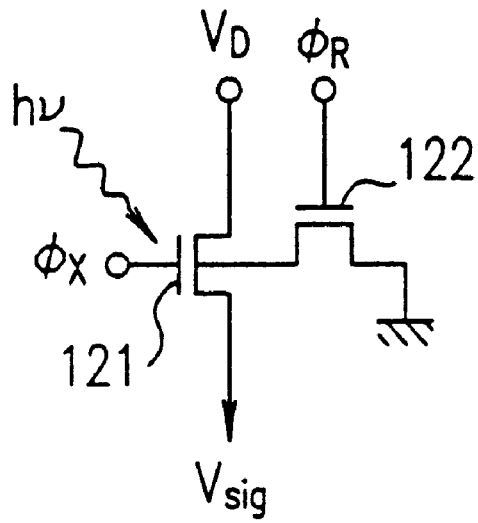
FIG. 13 is a circuit diagram showing another example of a pixel of an amplifying type solid-state imaging device.

FIG. 1 shows a solid-state imaging device according to Example 1 of the present invention. In Example 1, a plurality of pixels 1a and 1b are arranged in a matrix to form a receiving field. The configuration of the pixels 1a and 1b is substantially the same as that shown in FIG. 14 and includes the photoelectric conversion section 131 and the amplification section 132. The pixels 1a and 1b output signal voltages $V_{sig}$ in response to the pulse signal $\Phi_X$. The pixels 1a and 1b drain a signal charge in response to the pulse signal $\Phi_{R1}$ and $\Phi_{R2}$, respectively. Moreover, as described above, FIG. 14 is a schematic diagram commonly showing the configuration of a pixel shown in one of FIGS. 11 to 13 and, accordingly, the pixels 1a and 1b each correspond to a pixel, etc., shown in one of FIGS. 11 to 13.

The pixels 1a and 1b are alternately arranged for each of the horizontal rows i, (i+1), . . . , in the matrix arrangement, and the adjoining two pixels 1a and 1b are treated as a single sensing unit.

A readout signal line 3 is provided to extend from a readout circuit 2 to each of the horizontal rows. The readout circuit 2 sequentially sends out pulse signals $\Phi_X(i)$, $\Phi_X(i+1)$, . . . , through the respective readout signal lines 3. Thus, for each row, the pulse signal $\Phi_X$ is simultaneously applied to the photoelectric conversion sections 131 of the pixels 1a and 1b so that the signal voltage $V_{sig}$ is output from the photoelectric conversion sections 131 of the pixels 1a and 1b.

Moreover, a first reset signal line 4a is provided to extend from a first reset circuit 4 to each of the horizontal rows. The first reset circuit 4 is connected to the pixels 1a, and sequentially sends out pulse signals $\Phi_{R1}(i)$, $\Phi_{R1(i+1)}$, ..., through respective first reset signal lines 4a. Thus, for each row, the pulse signal $\Phi_{R1}$ is simultaneously applied to the photoelectric conversion sections 131 of the pixels 1a so that the signal charges are drained from the photoelectric conversion sections 131 of the pixels 1a to ground (not shown).

Similarly, a second reset signal line 5a is provided to extend from a second reset circuit 5 to each of the horizontal rows. The second reset circuit 5 is connected to the pixels 1b, and sequentially sends out pulse signals $\Phi_{R2}(i)$, $\Phi_{R2}(i+1)$, ..., through respective second reset signal lines 5a. Thus, for each row, the pulse signal $\Phi_{R2}$ is simultaneously applied to each of the photoelectric conversion sections 131 of the pixels 1b so that the signal charges are drained from the photoelectric conversion sections 131 of the pixels 1b to ground (not shown).

Moreover, vertical signal lines 6a and 6b are provided for each of the vertical columns j, (j+1), ..., in the arrangement of the sensing units 1. As the pixels 1a and 1b, the two vertical signal lines 6a and 6b are treated as a set. One of the vertical signal lines 6a is connected to the amplification sections 132 of the pixels 1a in a column, while the other one of the vertical signal lines 6b is connected to the amplification sections 132 of the pixels 1b in the column.

The vertical signal lines 6a are connected to a first horizontal signal line 9 via respective first selection transistors 7, while the vertical signal lines 6b are connected to a second horizontal signal line 10 via respective second selection transistors 8. As the pixels 1a and 1b, the two first and second selection transistors 7 and 8 are treated as a set.

A horizontal scanning circuit 11 sequentially selects sets of the first and second selection transistors 7 and 8. As each of the transistor sets is selected, a horizontal scanning signal is applied to the gates of the first and second transistors 7 and 8 so as to turn on the first and second transistors 7 and 8, thereby connecting the vertical signal lines 6a and 6b to the first and second horizontal signal lines 9 and 10, respectively.

The first and second horizontal signal lines 9 and 10 are connected to a differential amplifier 14 respectively via first and second amplifiers 12 and 13. The gain of the first amplifier 12 is set to be twice as great as that of the second amplifier 13.

Now, the operation of the solid-state imaging device having such a configuration will be described referring to the timing diagram of FIG. 2.

First, in the beginning of the frame period (F−1), the readout circuit 2 sequentially sends out the pulse signals $\Phi_X(i)$, $\Phi_X(i+1)$, ..., through the respective readout signal lines 3. In response to this, for each row, the photoelectric conversion sections 131 of the pixels 1a and 1b output respective signal voltages $V_{sig}$.

In synchronization with the pulse signals $\Phi_X(i)$, $\Phi_X(i+1)$, ..., the first reset circuit 4 sequentially sends out the pulse signals $\Phi_{R1}(i)$, $\Phi_{R1}(i+1)$, ..., through respective first reset signal lines 4a. In response to this, for each row, the photoelectric conversion sections 131 of the pixels 1a drain the signal charges. Similarly, the second reset circuit 5 sequentially sends out the pulse signals $\Phi_{R2}(i)$, $\Phi_{R2}(i+1)$, ..., through respective second reset signal lines 5a so that, for each row, the signal charge is drained from each of the photoelectric conversion sections 131 of the pixels 1b.

Therefore, in the beginning of the frame period (F−1), signal charges of all the pixels 1a and 1b are drained, thus resetting the pixels 1a and 1b.

After resetting all of the pixels 1a and 1b as described above, the pixels 1a and 1b perform photoelectric conversion and store signal charges so as to store signal charges corresponding to the amounts of light incident thereupon.

Then, in the end of the frame period (F−1), or in the beginning of the latter frame period F, only the first reset circuit 4 is activated so as to sequentially send out the pulse signals $\Phi_{R1}(i)$ $\Phi_{R1}(i+1)$, ..., from the first reset circuit 4 through respective first reset signal lines 4a. In response to this, for each row, the photoelectric conversion sections 131 of the pixels 1a each drain the signal charge.

Therefore, in the latter frame period F, after the signal charge is once drained from each of the pixels 1a in the beginning of the frame period F, a signal charge is again stored in each of the pixels 1a. On the other hand, each of the pixels 1b stores a signal charge without being discontinued.

Then, in the end of the frame period F or in the beginning of the frame period (F+1), as in the beginning of the frame period (F−1), the pulse signals $\Phi_X(i)$, $\Phi_X(i+1)$, ..., are sequentially sent out from the readout circuit 2 so that a signal voltage $V_{sig}$ is output from each of the photoelectric conversion sections 131 of the pixels 1a and 1b for each row. Moreover, the pulse signals $\Phi_{R1}(i)$, $\Phi_{R1}(i+1)$, ..., are sequentially sent out from the first reset circuit 4 so that the signal charge is drained from each of the photoelectric conversion sections 131 of the pixels 1a for each row. Similarly, the pulse signals $\Phi_{R2}(i)$, $\Phi_{R2}(i+1)$, ..., are sequentially sent out from the second reset circuit 5 so that the signal charge is drained from each of the photoelectric conversion sections 131 of the pixels 1b for each row.

That is, the pixels 1b store a signal charge over the frame periods (F−1) and F, and output signal voltages $V_{sig}$ corresponding to the stored signal charges at the end of the frame period F in response to the pulse signal $\Phi_X$ from the readout circuit 2. On the other hand, each of the pixels 1a is reset for every one of the frame periods (F−1) and F and drains the signal charge so that the pixel 1a outputs a signal voltage $V_{sig}$ corresponding to the signal charge which is stored only for the frame period F in response to the pulse signal $\Phi_X$ from the readout circuit 2.

For each row, the respective signal voltages $V_{sig}$ of the pixels 1a are sent to the respective vertical signal lines 6a, and the respective signal voltages $V_{sig}$ of the pixels 1b are sent to the respective vertical signal lines 6b.

On the other hand, in the end of the frame period F, each time the pulse signals $\Phi_X(i)$, $\Phi_X(i+1)$, ..., are output from the readout circuit 2, the horizontal scanning circuit 11 sequentially selects the sets of the first and second selection transistors 7 and 8, and applies a horizontal scanning signal to each of the gates of the selected first and second selection transistors 7 and 8 so as to turn on the first and second selection transistors 7 and 8, thereby connecting the vertical signal lines 6a and 6b to the first and second horizontal signal lines 9 and 10.

For example, while the pulse signal $\Phi_X(i)$ is being output from the readout circuit 2, the horizontal scanning circuit 11 sequentially selects the sets of first and second selection transistors 7 and 8 so as to turn on the selected first and second selection transistors 7 and 8, thereby connecting the vertical signal lines 6a and 6b to the first and second horizontal signal lines 9 and 10. At this point, in response to the pulse signal $\Phi_X(i)$, signal voltages $V_{sig}$ are being output from the respective pixels 1a and 1b of the sets in the ith row, whereby these sets are sequentially selected so that the signal voltages $V_{sig}$ of the respective pixels 1a and 1b of the selected set are transmitted to the first and second horizontal signal lines 9 and 10 via the selected first and second selection transistors 7 and 8, respectively.

Then, the former of the signal voltages $V_{sig}$ of the respective pixels 1a and 1b of a set is amplified by the first amplifier 12 at a gain twice as high as that for the latter, whereas the latter is amplified by the second amplifier 13. Thus, the signal voltage $V_{sig}$ of the pixel 1a being doubled and the signal voltage $V_{sig}$ of the pixel 1b are applied to the differential amplifier 14. The differential amplifier 14 obtains and outputs the difference in signal voltage $V_{sig}$ therebetween.

The difference in signal voltage $V_{sig}$ between the pixels 1a and 1b is obtained for each of the sets in the $i^{th}$ row so that the differences in signal voltage $V_{sig}$ between the pixels 1a and 1b of the respective sets are sequentially output.

Such an operation is repeated for each row so as to sequentially output from the differential amplifier 14 the difference in signal voltage $V_{sig}$ between the pixels 1a and 1b of each of the sets.

Moreover, such an operation of obtaining the difference in signal voltage $V_{sig}$ between the pixels 1a and 1b of the sets is repeated for two frame periods.

Figure 3A:
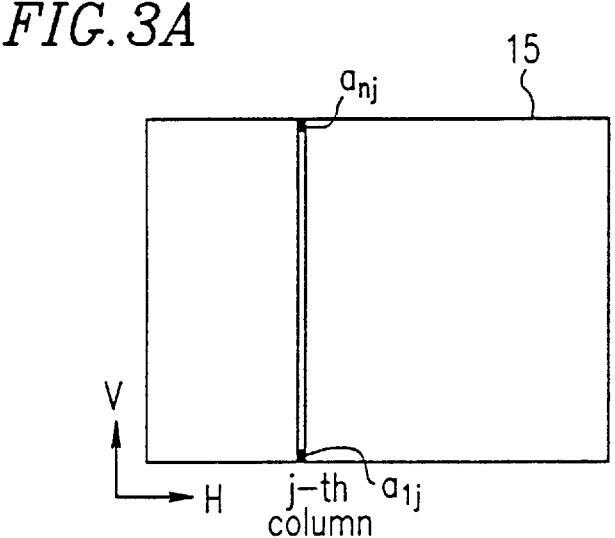
FIG. 3A is a diagram showing a receiving field in the device of FIG. 1.
Figure 3B:
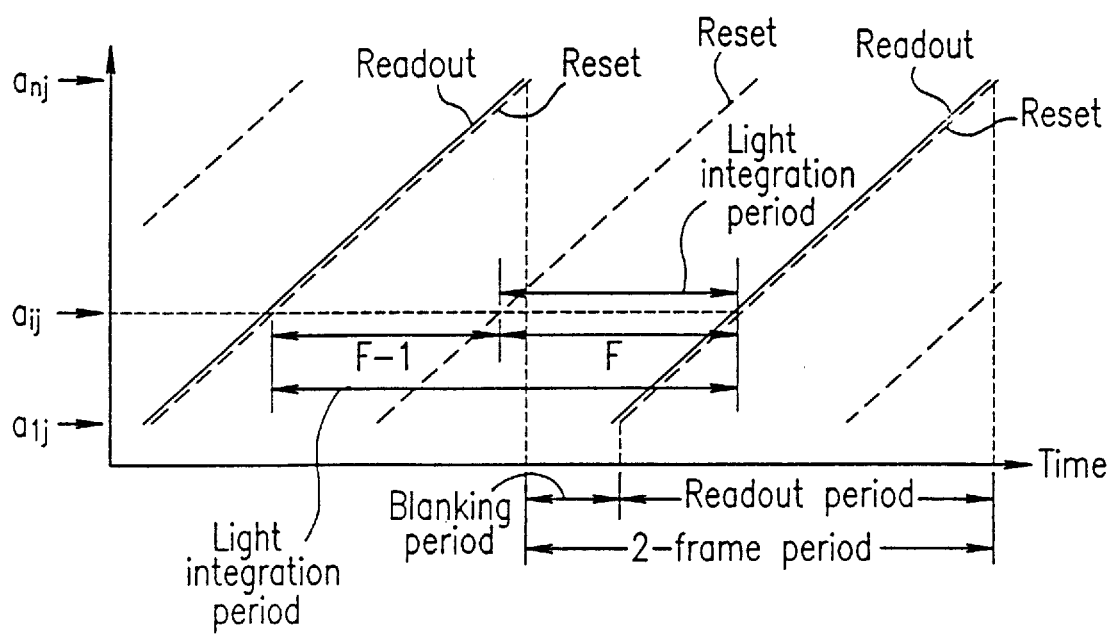
FIG. 3B is a diagram showing the timings of the readout and reset operations in the device of FIG. 1.

The above-described operations will be described with reference to FIGS. 3A and 3B. In each of the first to $n^{th}$ sensing units 1 ($a_{1j}$ to $a_{nj}$) along the vertical $j^{th}$ column in a receiving field 15 in FIG. 3A, for each two consecutive frame periods, as shown in FIG. 3B, the pixels 1a and 1b of the sensing units 1 are read out, and the pixels 1b of the sensing units 1 are reset while, for each frame period, the pixels 1a of the sensing units 1 are reset.

The pixel 1b of a set of the pixels 1a and 1b stores a signal charge for the frame periods (F−1) and F and outputs a signal voltage $V_{sig}$ at the end of the frame period F. The signal voltage $V_{sig}$ corresponds to the signal charge stored for the frame periods (F−1) and F. On the other hand, the pixel 1a, which is reset for each of the frame periods (F−1) and F, outputs a signal voltage $V_{sig}$ at the end of the frame period F. The signal voltage $V_{sig}$ corresponds to the signal charge stored only for the frame period F.

Therefore, a period of time for which the pixel 1a stores a signal charge is ½ of that for which the pixel 1b stores a signal charge. Accordingly, if the image on the receiving field is stationary, whereby the same amount of light is incident upon the pixels 1a and 1b, which are treated as a single sensing unit 1, the signal voltage $V_{sig}$ from the pixel 1a is ½ of the signal voltage $V_{sig}$ from the pixel 1b. The respective signal voltages $V_{sig}$ of the pixels 1a and 1b are amplified by the respective amplifiers 12 and 13. The signal voltage $V_{sig}$ of the pixel 1a is amplified at a gain twice as high as that for the signal voltage $V_{sig}$ of the pixel 1b, whereby the respective outputs of the amplifiers 12 and 13 are equal to each other, and the differential amplifier 14 obtains a difference of zero.

On the other hand, if the image on the receiving field has moved, whereby there is some difference in the amount of incident light between the pixels 1a and 1b, which are treated as a single sensing unit 1 over the frame periods (F−1) and F, the signal voltage $V_{sig}$ from the pixel 1a is not ½ of the signal voltage $V_{sig}$ from the pixel 1b. In that case, even if the signal voltage $V_{sig}$ of the pixel 1a is amplified at a gain twice as high as that for the signal voltage $V_{sig}$ of the pixel 1b, the signal voltage $V_{sig}$ of the pixel 1a being doubled is not equal to the signal voltage $V_{sig}$ of the pixel 1b, whereby the difference obtained by the differential amplifier 14 is not zero.

Therefore, based on the output of the differential amplifier 14, it is possible to detect whether the image on the receiving field has moved. The image on the receiving field can be considered as having moved if the output of the differential amplifier 14 for at least one set of the pixels 1a and 1b is not zero.

In order to obtain an ordinary video signal from this solid-state imaging device, an output of the second amplifier 13 can be taken out via an output line 16 to be a video signal. However, since the output of the second amplifier 13 is obtained by amplifying the respective signal voltages $V_{sig}$ of the pixels 1b and does not include the signal voltages $V_{sig}$ of the pixels 1a, the resolution of the receiving field is ½ of that of the receiving field of all the pixels 1a and 1b.

Figure 4:
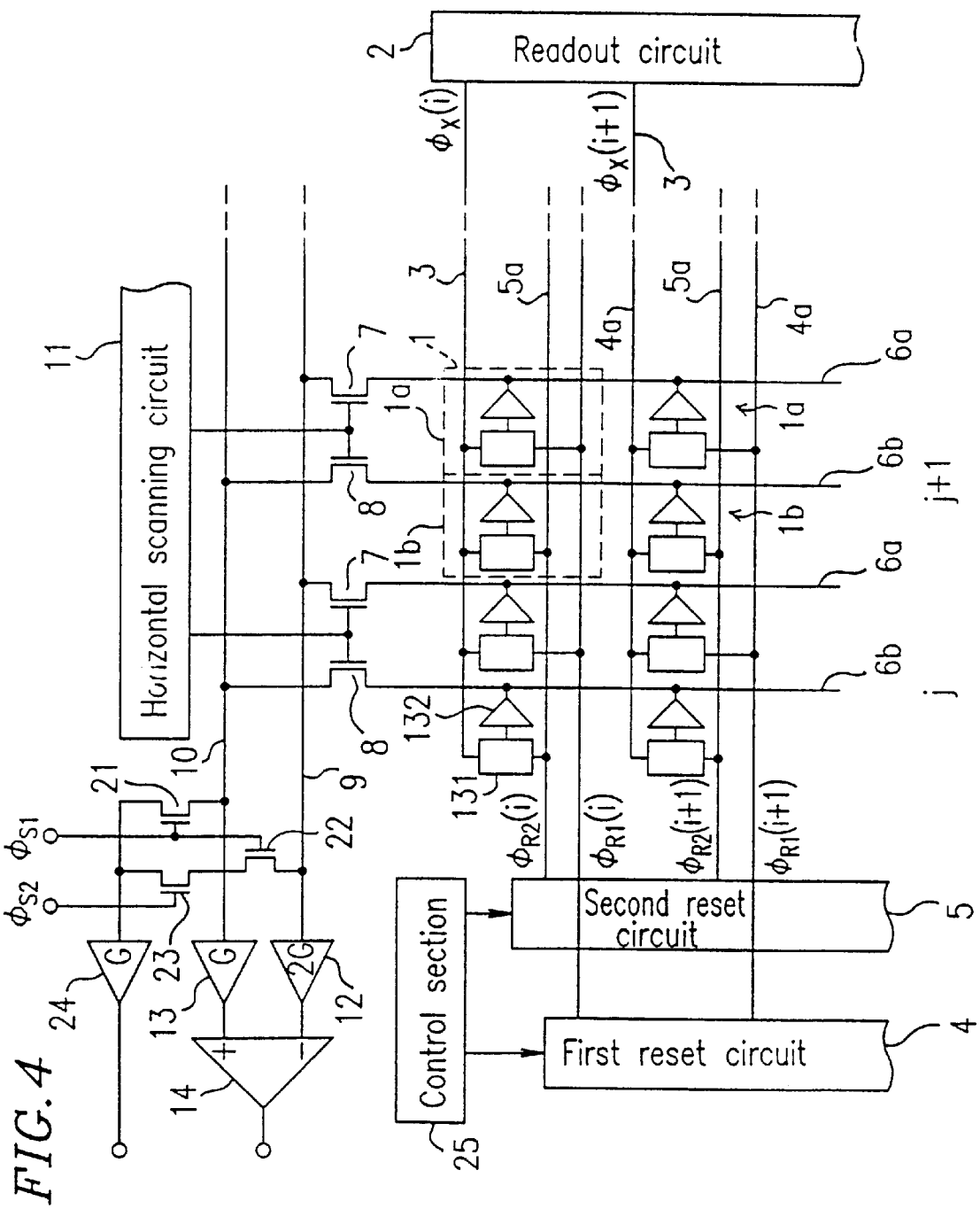
FIG. 4 is a block diagram showing a solid-state imaging device according to Example 2 of the present invention.

FIG. 4 shows a solid-state imaging device according to Example 2 of the present invention. In Example 2, first, second and third transistors 21, 22 and 23 and an amplifier 24 are provided instead of the output line 16 in the device of FIG. 1, and a reset circuit control section 25 is additionally provided.

In order to detect motion of the image on the receiving field, a similar operation as in the device of FIG. 1 is performed while, in order to obtain an ordinary video signal, the following operation is performed.

First, the reset circuit control section 25 controls the operation of the first and second reset circuits therebetween so as to have the first and second reset circuits 4 and 5 reset the respective pixels 1a and 1b for each frame period. Accordingly, the respective signal voltages $V_{sig}$ of the pixels 1a and 1b are read out by the readout circuit 2 for each frame period.

In effect, the pixels 1a and 1b are repeatedly reset, store signal charges and output the signal voltages $V_{sig}$.

The horizontal scanning circuit 11 operates similarly as the device of FIG. 1, and sequentially selects the sets of the first and second selection transistors 7 and 8, so as to turn on the selected first and second selection transistors 7 and 8, thereby connecting the vertical signal lines 6a and 6b to the first and second horizontal signal lines 9 and 10.

Thus, the sets of the pixels 1a and 1b in a row are sequentially selected, and the respective signal voltages $V_{sig}$ of the pixels 1a and 1b of the selected set are transmitted to the first and second horizontal signal lines 9 and 10.

In a period of time during which the signal voltages $V_{sig}$ of the pixels 1a and 1b are being transmitted to the first and second horizontal signal lines 9 and 10, the pulse signal $\Phi_{S1}$ is applied to the transistors 21 and 22 at the same period and phase as the period T (not shown) at which the pixels in the horizontal direction are sequentially selected by the horizontal scanning circuit 11, whereby the signals of the pixels 1a and 1b are sampled by the transistors 21 and 22 at the period T. The pulse signal $\Phi_{S2}$ is applied to the transistor 23. The phase of the pulse signal $\Phi_{S2}$ lags behind the phase of the pulse signal $\Phi_{S2}$ by T/2 phase. Furthermore, the pixel signal of the pixel 1a is again sampled by the third transistor 23 so as to be output the pixel signal of the pixel 1a from the transistor 23. The pixel signal of the pixel 1a lags behind the pixel signal of the pixel 1b corresponding to the pixel signal of the pixel 1a by T/2 phase. That is, the pixel signal of the pixel 1b is obtained in the first half T/2 of the period T, and the pixel signal of the pixel 1a is obtained in the latter half T/2 thereof.

Such sampling of the first to third transistors 21 to 23 is performed for each set of pixels 1a and 1b in a row, and is repeated by rows. Thus, the pixels 1a and 1b are alternately selected in every set so that the respective signal voltages $V_{sig}$ of the pixels 1a and 1b are sequentially output from the amplifier 24.

By taking out the signal voltages $V_{sig}$ of all the pixels 1a and 1b in this way, no pixel is wasted, whereby the resolution of the receiving field does not have to be deteriorated. However, in this case, the operations of the first and second reset circuits 4 and 5 and the readout circuit 2 will be different from those when detecting motion of the image on the receiving field, whereby it is not possible to detect motion of the image on the receiving field while obtaining an ordinary video signal.

Figure 5:
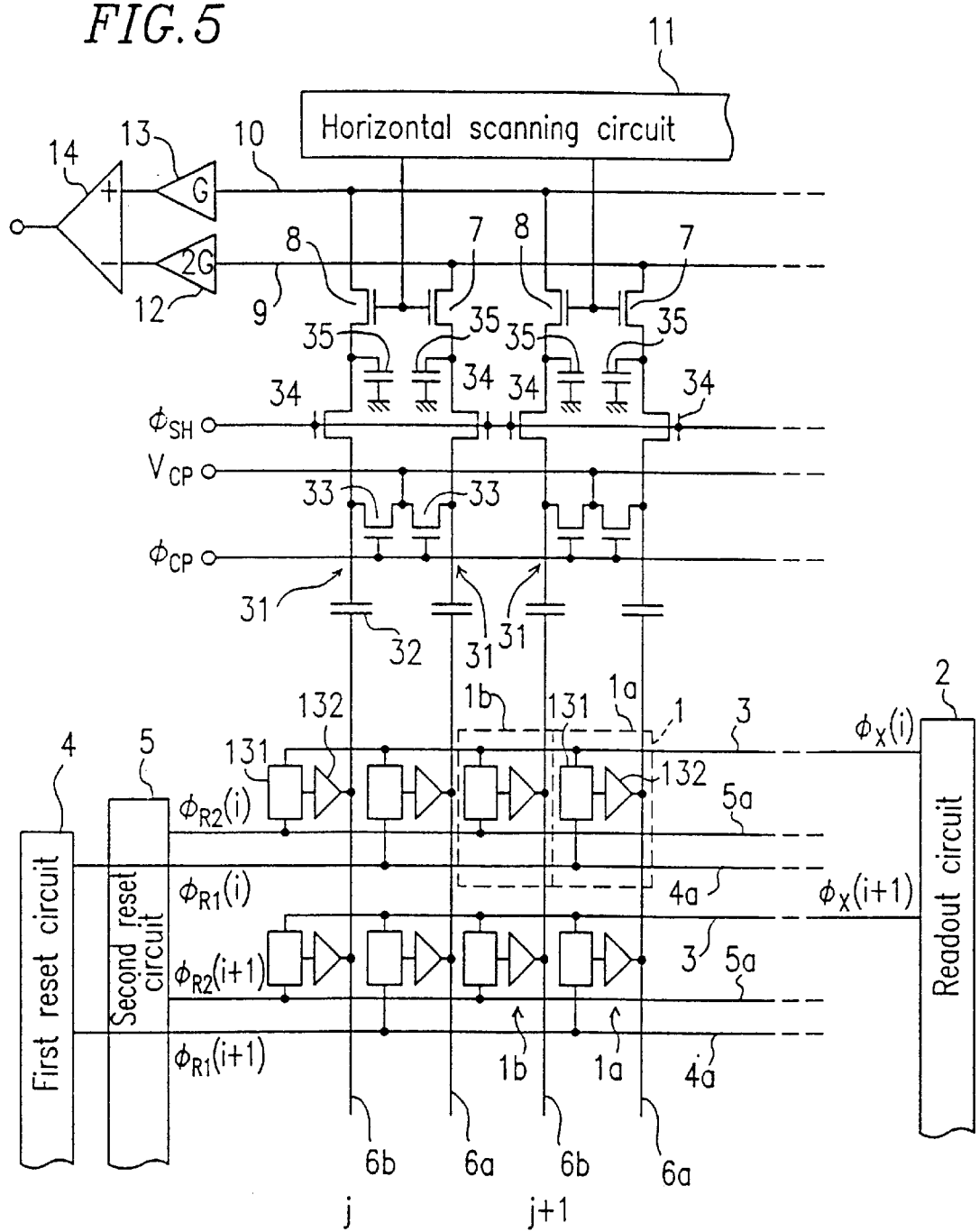
FIG. 5 is a block diagram showing a solid-state imaging device according to Example 3 of the present invention.

FIG. 5 shows a solid-state imaging device according to Example 3 of the present invention. In Example 3, as compared to Example 1, a correlated double sampling (CDS) circuit 31 is inserted between each pair of the vertical signal lines 6a and 6b.

The correlated double sampling circuit 31 receives a signal voltage $V_{sig}$ from a pixel while also receiving a signal voltage from a pixel even after the signal charge has been drained out of the pixel, and obtains the difference between the signal voltage $V_{sig}$ in the readout period and a signal voltage $V_{res}$ after signal charge drainage, so as to output a signal voltage of the difference. The signal voltage of the difference is the difference between the signal voltage in the readout period and that after the signal charge drainage, whereby the difference can be obtained for each pixel so as to cancel the variation of the threshold value of the pixels (this variation corresponds to the variation of the signal voltages after signal charge drainage), so as to suppress the fixed pattern noise (FPN) of the pixels which occurs due to this variation.

The correlated double sampling circuit 31 includes a clamp circuit and a sample hold circuit.

The clamp circuit includes a clamp capacitor 32 and a clamp transistor 33. In the readout period, the signal voltage $V_{sig}$ from the pixel is input to the clamp capacitor 32 so as to turn on the clamp transistor 33, thereby converting the signal voltage $V_{sig}$ to a clamp voltage $V_{CP}$, subsequently turning off the clamp transistor 33.

After signal charge drainage, the signal voltage $V_{res}$ from the pixel is input to the clamp capacitor 32 so as to create a clamp voltage $V_{CP}$−(signal voltage $V_{sig}$−signal voltage $V_{res}$), and retains the signal voltage of the difference. For example, if the clamp voltage $V_{CP}$ is at the ground potential, a signal voltage $[-(V_{sig}-V_{res})]$ is retained.

The sample hold circuit includes a sample transistor 34 and a sample hold capacitor 35. After the signal voltage of the difference $[-(V_{sig}-V_{res})]$ is created by the clamp circuit, the sample transistor 34 is turned on, so as to apply the signal voltage of the difference $[-(V_{sig}-V_{res})]$ to the sample hold capacitor 35. The sample hold capacitor 35 applies the signal voltage of the difference $[-(V_{sig}-V_{res})]$ to the selection transistor 7 (and the selection transistor 8) while retaining it.

Such an operation is performed for each of the pixels in a horizontal row, so as to apply signal voltages $[-(V_{sig}-V_{res})]$ based the signal charges of the respective pixels to the respective selection transistors 7 (and the respective selection transistors 8).

Figure 6:
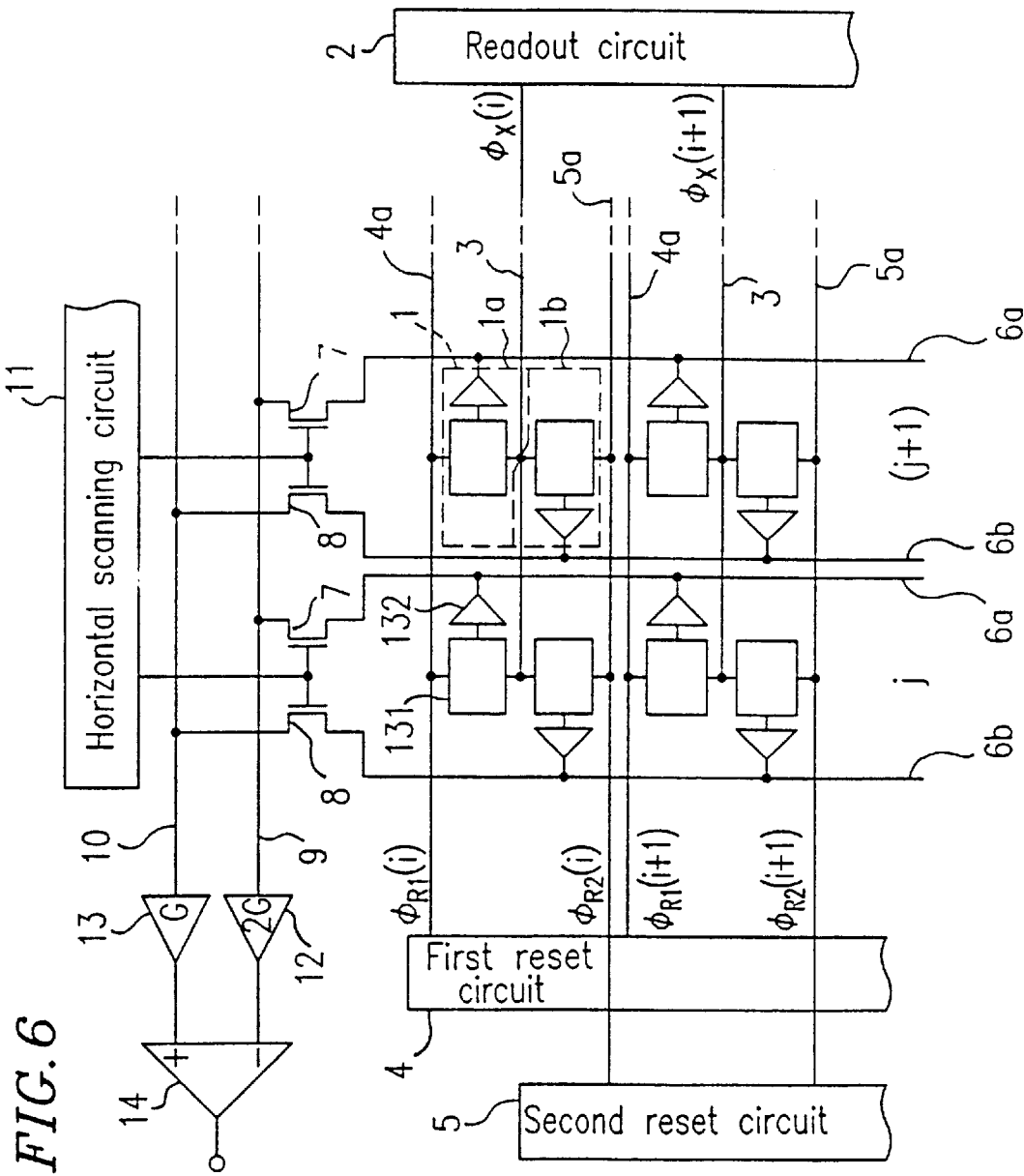
FIG. 6 is a block diagram showing a solid-state imaging device according to Example 4 of the present invention.

FIG. 6 shows a solid-state imaging device according to Example 4 of the present invention. In Example 4, the pixels 1a and 1b are provided in an alternate arrangement for each of the vertical columns j, (j+1), . . . , in the arrangement of the sensing units 1, where two vertically adjoining pixels 1a and 1b are treated as a single sensing unit 1.

Accordingly, the readout signal line 3 of the readout circuit 2 is provided for each two rows and is connected to the pixels 1a and 1b in two different rows. Moreover, the first reset signal lines 4a of the first reset circuit 4 are connected to the respective pixels 1a in the odd-numbered rows, while the second reset signal lines 5a of the second reset circuit 5 are connected to the respective pixels 1b in the even-numbered rows.

The arrangement of the pixels 1a and 1b (i.e., the pixels for storing a signal charge only for the latter frame period and the pixels for storing a signal charge for two consecutive frame periods) can be variously modified. For example, the pixels 1a and 1b can be arranged in a diagonal arrangement. Alternatively, adjacent three or more pixels can be combined and treated as a single sensing unit.

It should be noted that a set of the pixels 1a and 1b treated as a single sensing unit 1 are spaced apart from each other, though slightly. Thus, the difference in signal voltage $V_{sig}$ between the pixels 1a and 1b does not always occur due to motion of the image on the receiving field, but may also occur due to nonuniformity of the light intensity of the image on the receiving field. In any case, the output of the differential amplifier 14 is not zero, thereby presenting a possibility for an error in detecting motion of an image.

Figure 7:
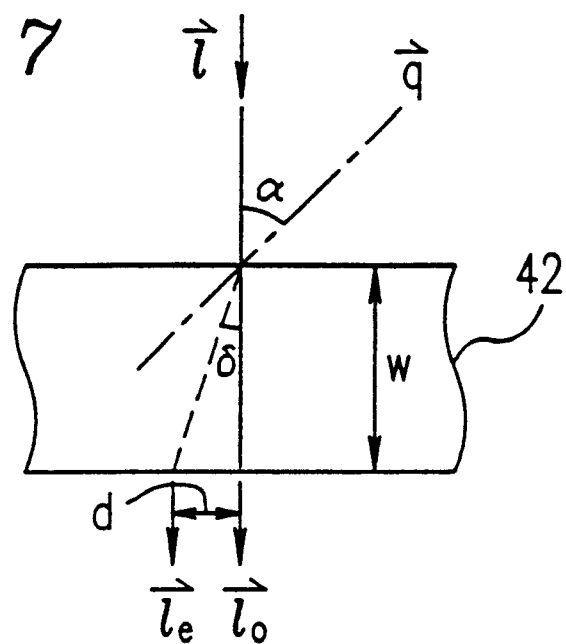
FIG. 7 is a diagram schematically showing a birefringent plate to be placed over the receiving field of the solid-state imaging device of the present invention.
Figure 8:
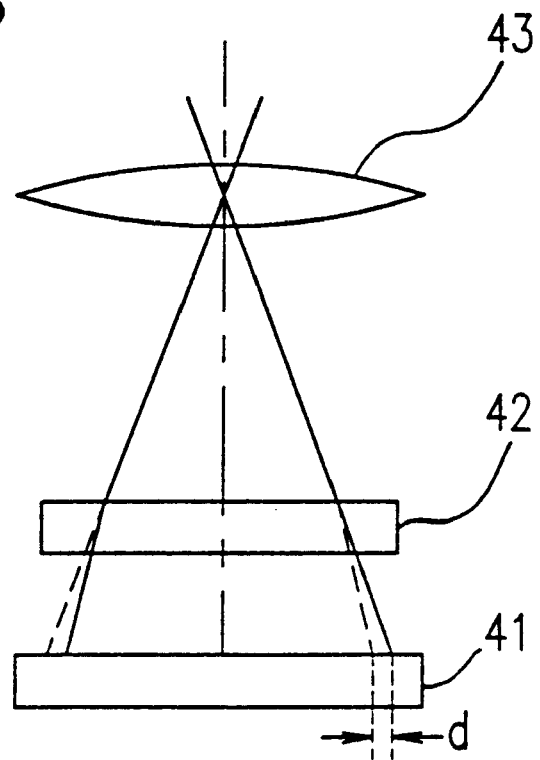
FIG. 8 is a diagram showing the birefringent plate of FIG. 7 being placed over the receiving field of the solid-state imaging device of the present invention.

In order to prevent such an error, as shown in FIGS. 7 and 8, a birefringent plate 42 having some birefringent property can be placed over the receiving field 41 of the solid-state imaging device of the present invention.

The birefringent plate 42 may be quartz, for example, which is cut out so that the normal of the surface thereof crosses the optical axis →q unique to crystals at an angle α. A light beam →l perpendicularly incident upon the birefringent plate 42 is separated into an ordinary light beam →lo and an extraordinary light beam →le. The separation distance d between the ordinary light beam →lo and an extraordinary light beam →le is determined by the thickness w of the birefringent plate 42 and the angle δ. The angle δ depends upon the respective refractive indices of the ordinary light beam →lo and an extraordinary light beam →le and upon the angle α. In the case of quartz, α=44.8°, and the maximum value of tanδ is 5.876×10⁻³.

$$d = w \cdot \tan\delta \tag{1}$$

By setting the separation distance d to be identical the separation distance between the pixels 1a and 1b, it is possible to prevent an error in detecting motion due to the non-uniformity of the light intensity of the image.

That is, as shown in FIG. 8, a light beam incident via an imaging lens 43 is incident upon the receiving field 41 via the birefringent plate 42 so as to form an image on the receiving field 41. When the separation distance d by the birefringent plate 42 is set to be identical to the separation distance between a set of pixels 1a and 1b, since any light beam coming via the birefringent plate 42 is incident upon the receiving field 41 with the separation distance d, the same amount of light is incident upon the pixels 1a and 1b. Thus, it is possible to prevent an error in detecting motion due to the non-uniformity of the light intensity of the image.

In motion detection using this solid-state imaging device under an artificial light source, it is necessary to identify whether the variation of the amount of light incident upon the pixels 1a and 1b is due to the motion of the image or due to the periodic variation of the light intensity of the artificial light source.

Figure 9:
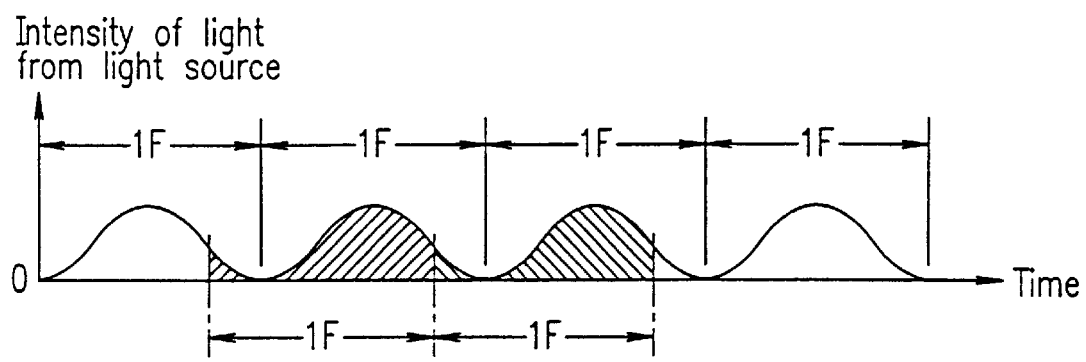
FIG. 9 is a diagram illustrating the frame period of the solid-state imaging device of the present invention.

To do this, the frame period is set to be a multiple of the period of the artificial light source, as shown in FIG. 9. Thus, all frame periods will have the same average value of the light intensity of the artificial light source over one frame period, but the average value does not change over periods. Therefore, it is possible to identify that the variation of the amount of light incident upon the pixels 1a and 1b is due to motion of the image on the receiving field, whereby the motion of the image can be detected without an error.

Figure 10:
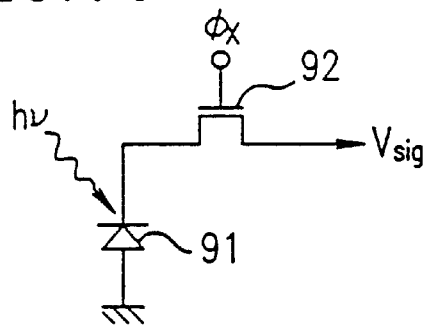
FIG. 10 is a circuit diagram showing a pixel of a non-amplifying type solid-state imaging device.
Figure 14:
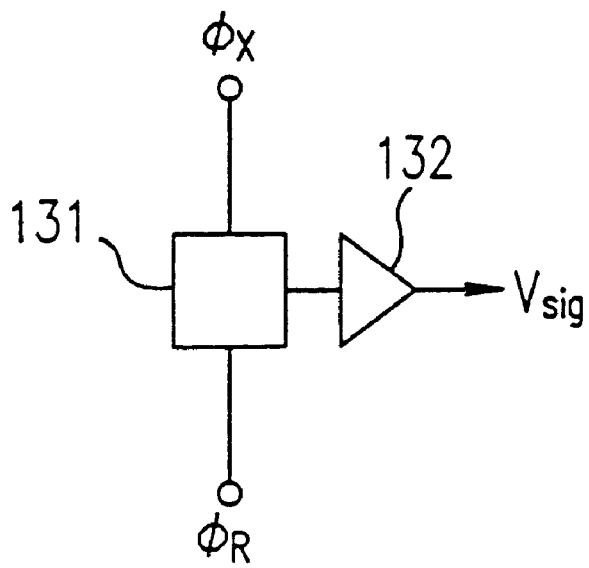
FIG. 14 is a block diagram schematically showing the circuit shown in one of FIGS. 11 to 13.
Figure 15:
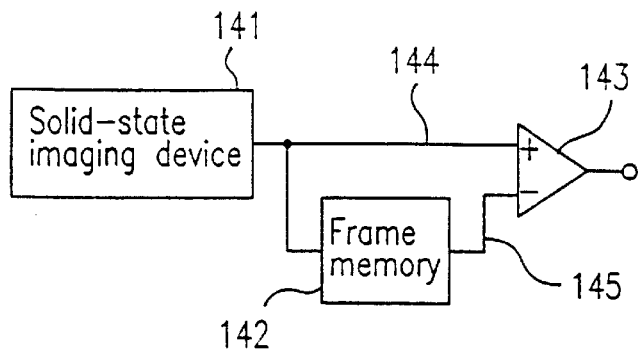
FIG. 15 is a block diagram showing an example of a conventional device.
Figure 16:
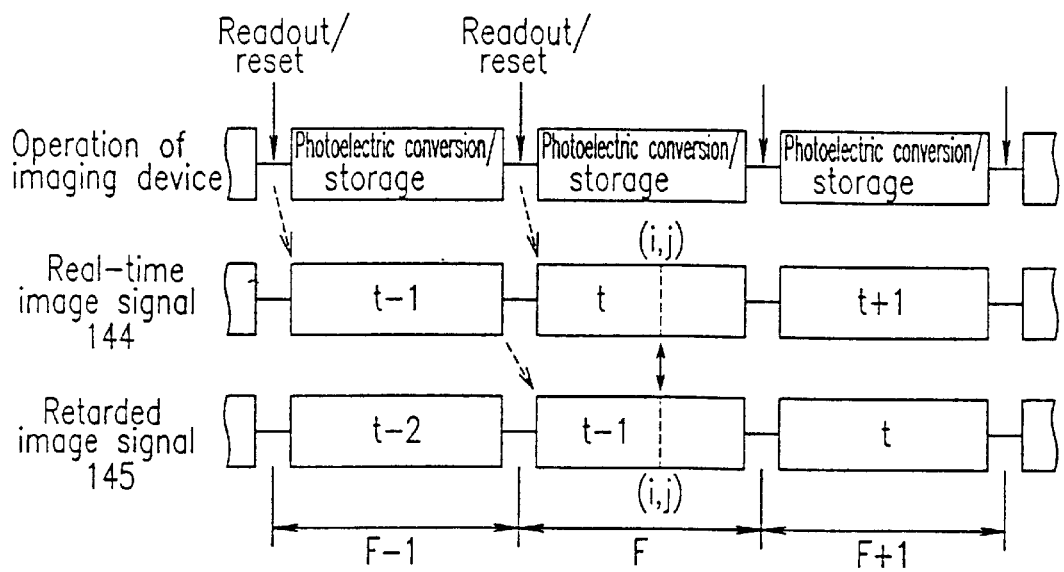
FIG. 16 is a timing diagram showing timings of the signals used in the device of FIG. 15.
Figure 17:
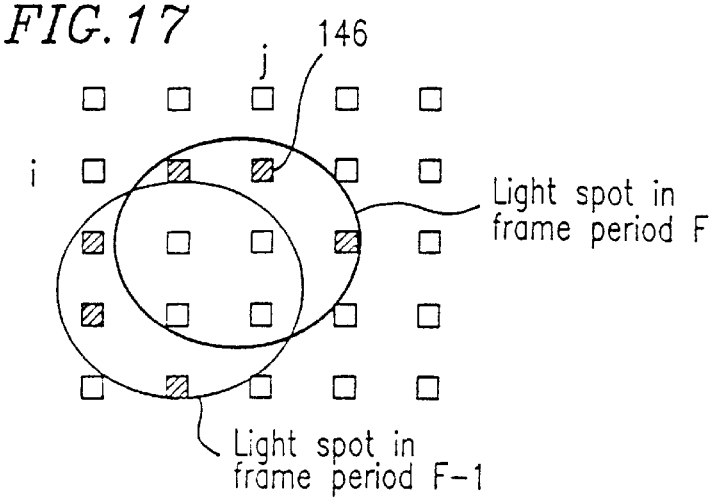
FIG. 17 is a diagram showing motion an a receiving field.
Figure 18:
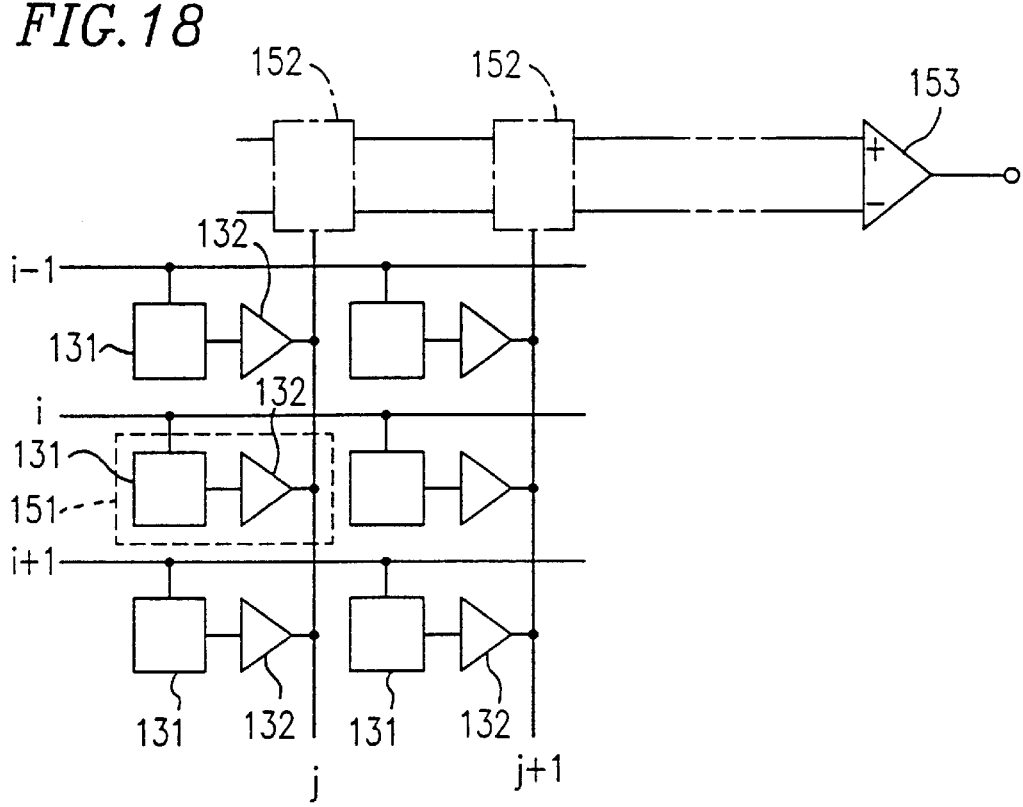
FIG. 18 is a block diagram showing another example of a conventional device.
Figure 19:
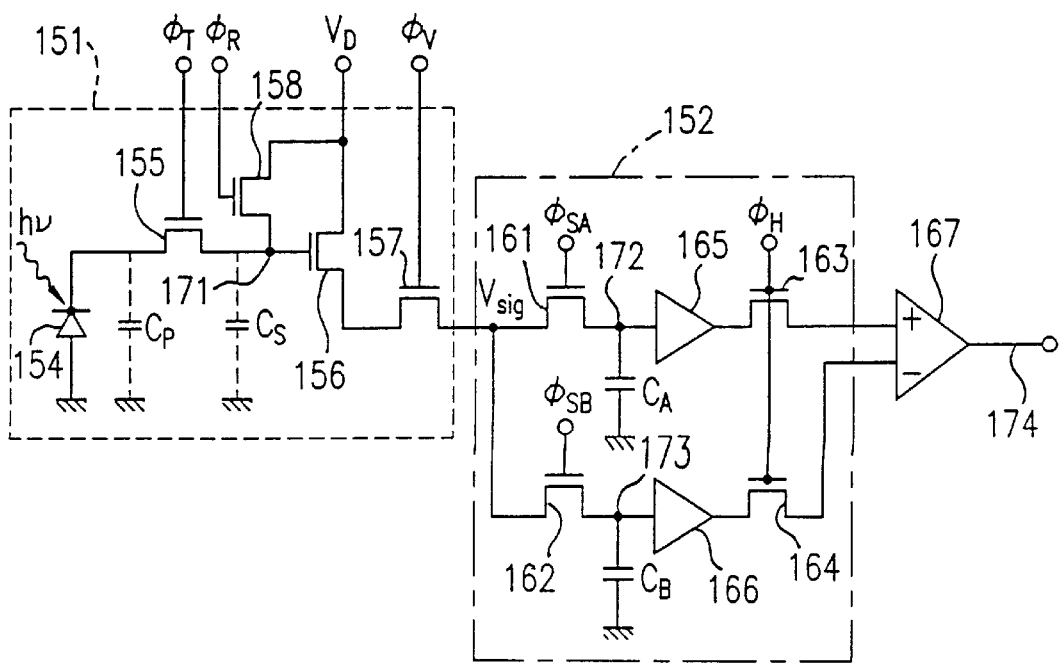
FIG. 19 is a diagram showing a configuration of a pixel and a column amplifier in the device of FIG. 18.
Figure 20:
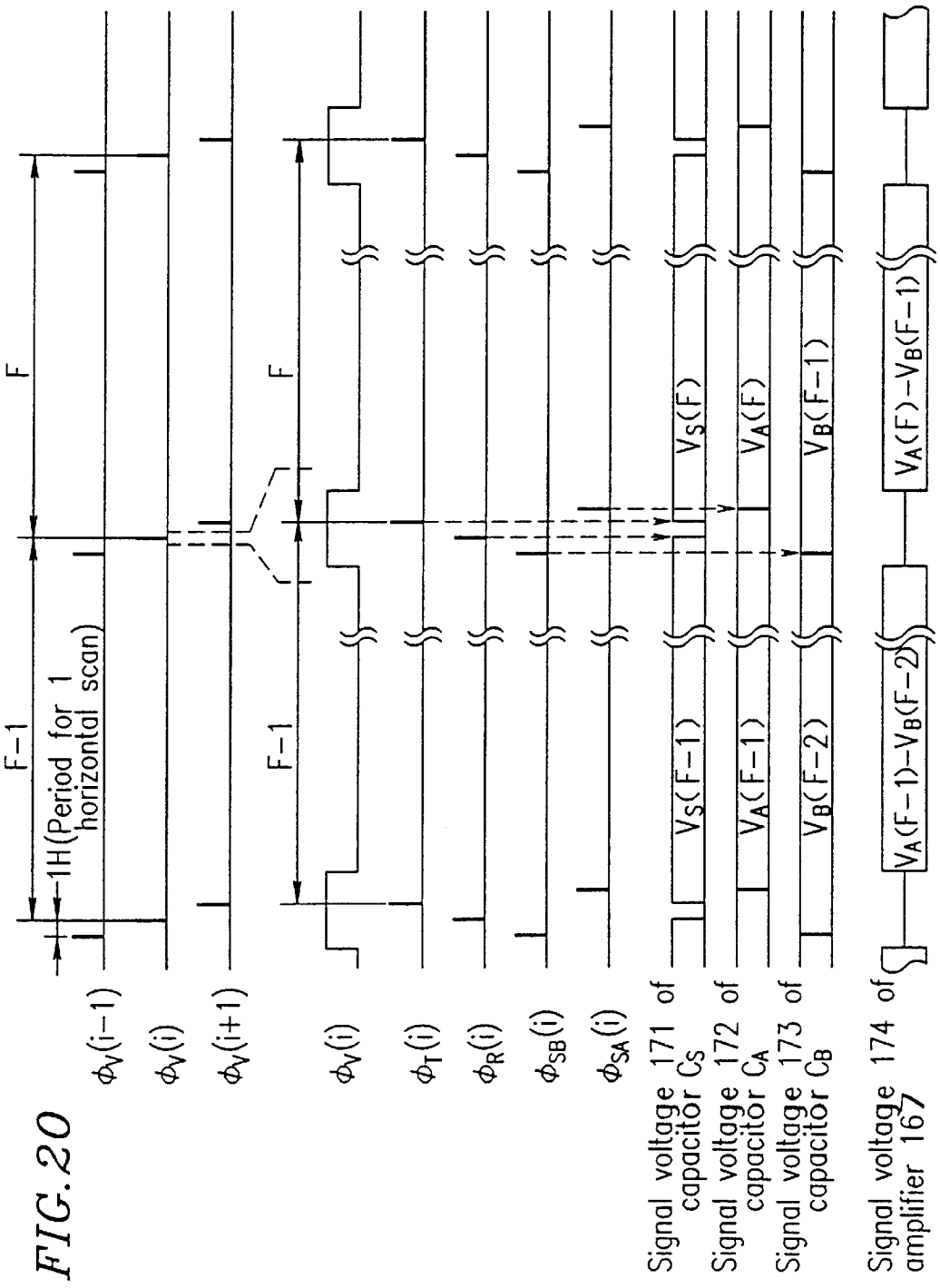
FIG. 20 is a timing diagram showing timings of the signals used in the device of FIG. 18.

In the above-described examples, an amplifying type device as shown in FIG. 14 is used as each of the pixels 1a and 1b, but it is also applicable to use those of the non-amplifying type as shown in FIG. 10. In such a case, however, it is necessary to synchronize a readout pulse signal and a reset pulse signal, and it is necessary to truncate the signal voltage read out from the pixels 1a at the beginning of the latter of two consecutive frame periods.

Figure 21:
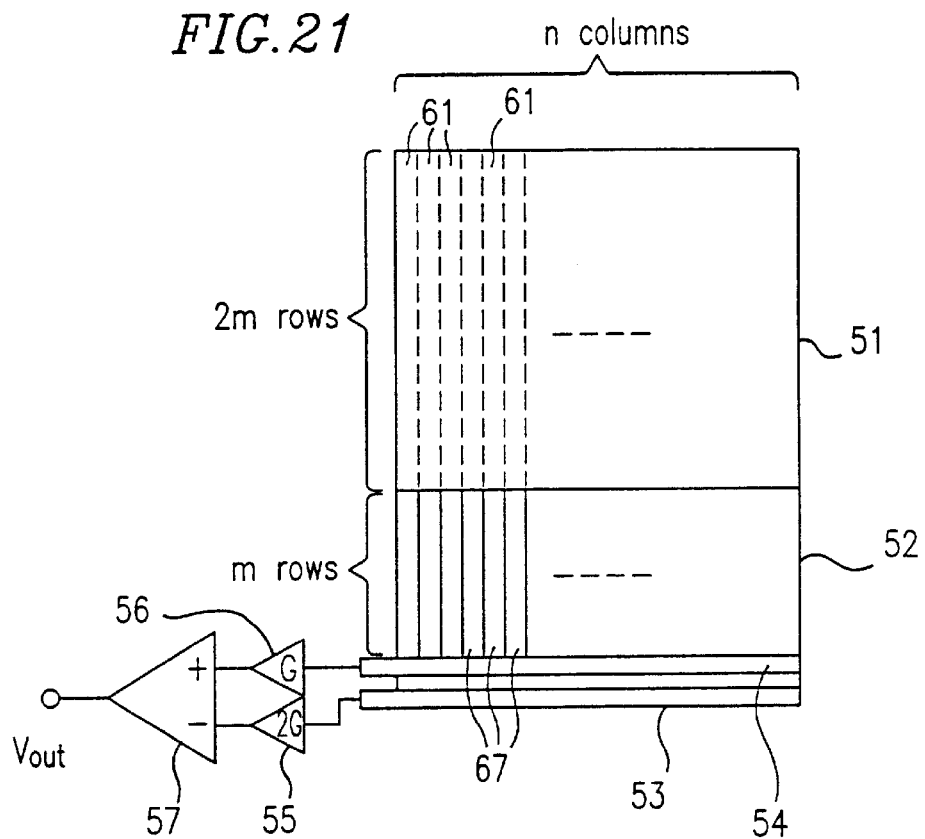
FIG. 21 is a block diagram showing a solid-state imaging device according to Example 5 of the present invention.

FIG. 21 shows a solid-state imaging device according to Example 5 of the present invention. The solid-state imaging device utilizes a CCD, and includes an imaging section 51, a storage section 52, first and second horizontal CCDs 53 and 54, first and second amplifiers 55 and 56 and a differential amplifier 57.

Figure 22:
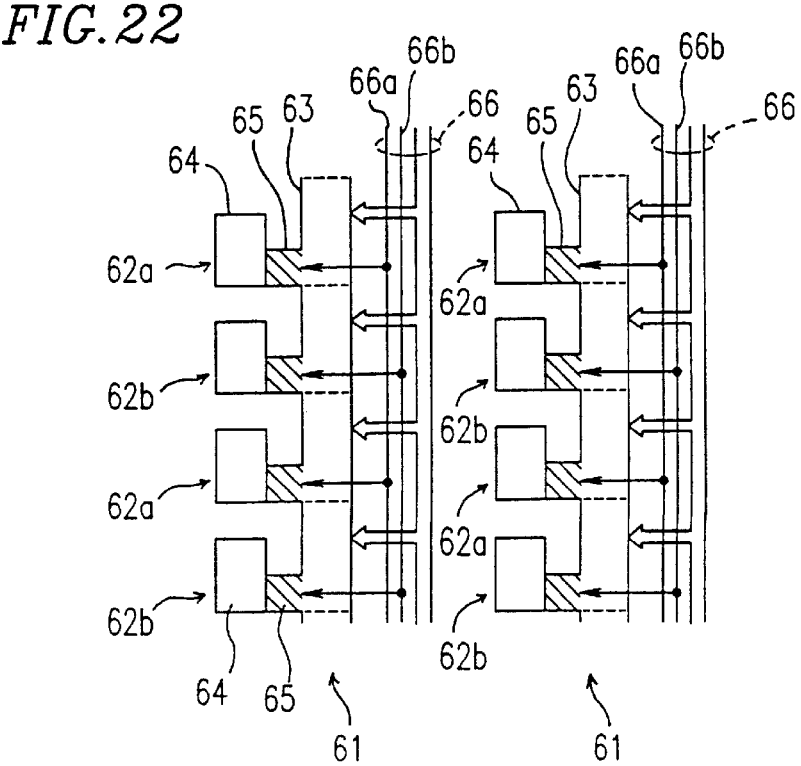
FIG. 22 is a block diagram showing an imaging section in the solid-state imaging device of FIG. 21.

The imaging section 51 includes pixels arranged in a 2 m×n matrix arrangement. The pixels 62a and 62b are alternately provided along each column 61, as shown in FIG. 22, and a vertical CCD 63 is provided along each column. The pixels 62a and 62b each include a photoelectric conversion section 64 and a transmission gate section 65, and the photoelectric conversion sections 64 of the pixels 62a and 62b in a column are connected to the vertical CCD 63 via the respective transmission gate sections 65.

The photoelectric conversion sections 64 of the pixels 62a and 62b each perform photoelectric conversion so as to create and store a signal charge. The signal charges of the pixels 62a and 62b are transmitted to the vertical CCD 63 via the respective transmission gate sections 65. For each column 61, the vertical CCD 63 receives the signal charges from the 2 m pixels 62a and 62b and transmit these signal charges while storing them.

The transmission gate sections 65 of the pixels 62a and 62b and the vertical CCD 63 are controlled via a group of transmission electrode control signal lines 66 for each column. The transmission gate section 65 of the pixel 62a and that of the pixel 62b are controlled respectively by different transmission electrode control signal lines 66a and 66b. Thus, it is possible to separately control the transmission gate section 65 of the pixel 62a and that of the pixel 62b, whereby it is possible to transfer and transmit only the signal charges of the pixels 62a to the vertical CCD 63 via the transmission gate section 65 of the pixels 62a, or to transfer and transmit the signal charges of the pixels 62a and 62b to the vertical CCD 63 via the respective transmission gate sections 65 of the pixels 62a and 62b.

A storage section 52 includes vertical CCDs 67 respectively for n columns. The vertical CCD 67 transmits signal charges from m pixels while storing them. Therefore, the storage section 52 is capable of storing and transmitting signal charges from the m×n-column pixels, i.e., signal charges from ½ of the pixels in the imaging section 51.

Next, the operation of the solid-state imaging device according to Example 5 will be described with reference to the timing diagram of FIG. 23.

First, in the frame period F, photoelectric conversion and signal charge storage by the photoelectric conversion sections 64 of the pixels 62a and 62b begin at time t1. At time t3 during the frame period F, i.e., when ½ of the frame period F has elapsed, only the pixels 62a are reset, so as to sequentially transmit the signal charges of the pixels 62a from the vertical CCDs 63 to the vertical CCDs 67 of the storage section 52. As indicated by arrows 71 to 74 in FIG. 23, the signal charges of the pixels 62a are transmitted at a normal transmission rate from time t3 to time t4, and are transmitted at a higher transmission rate from time t4 to time t6. Then, the signal charges of the pixels 62a are drained through the first horizontal CCD 53, the first amplifier 55 and the differential amplifier 57.

From time t3 to time t5, photoelectric conversion and signal charge storage by the photoelectric conversion sections 64 of the pixels 62a are resumed, while photoelectric conversion and signal charge storage by the photoelectric conversion sections 64 of the pixels 62b continues.

Therefore, the photoelectric conversion sections 64 of the pixels 62a each store a signal charge only for ½ of the frame period F, and the photoelectric conversion sections 64 of the pixels 62b each store a signal charge for the frame period F, whereby the storage period of the pixels 62a is ½ of that of the pixels 62b.

Next, at time t5, all the pixels 62a and 62b are reset, and the signal charges of the pixels 62a and 62b are sequentially transmitted from the vertical CCDs 63 to the vertical CCDs 67 of the storage section 52.

Figure 23:
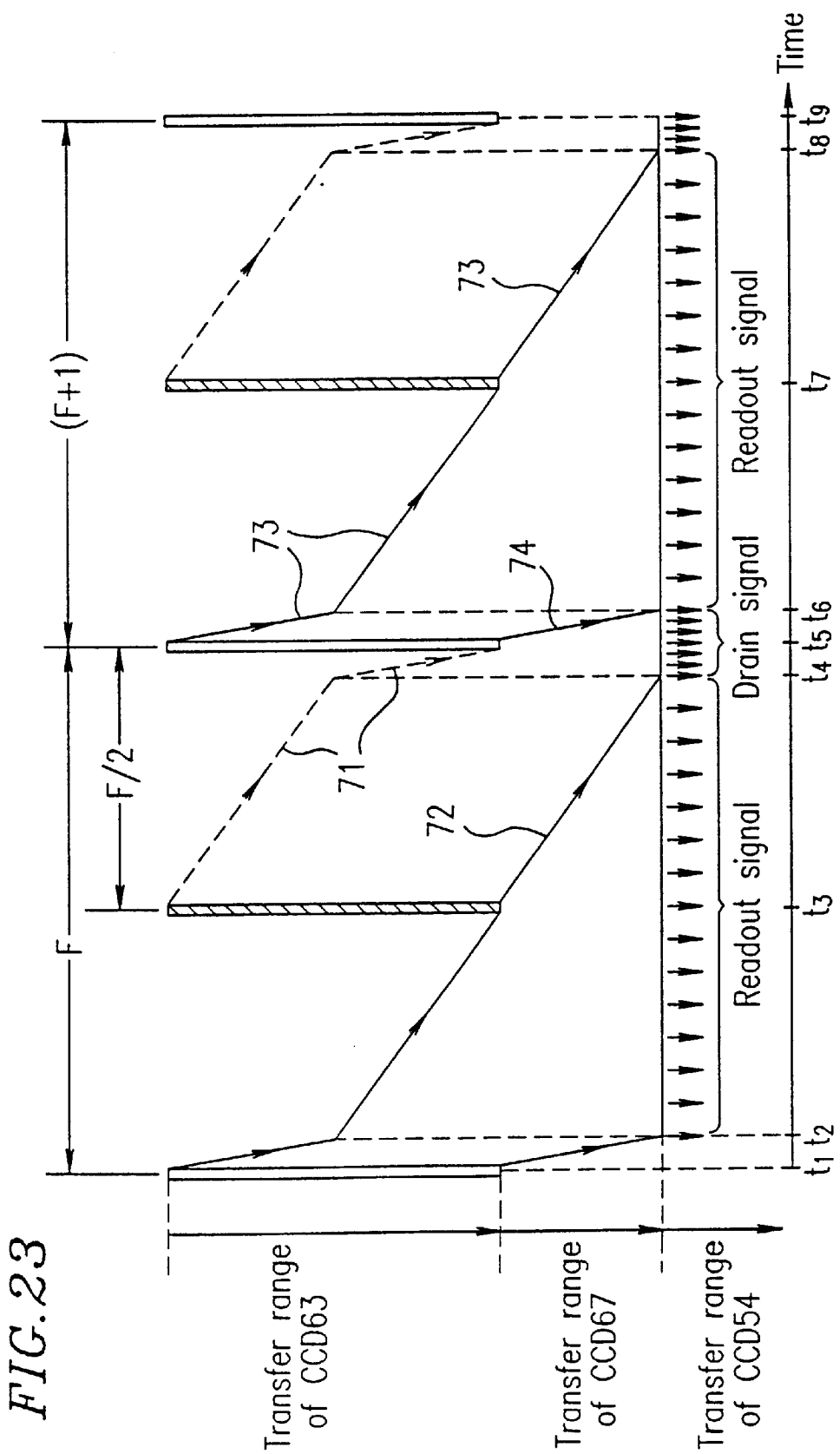
FIG. 23 is a timing diagram illustrating the operation of the solid-state imaging device of FIG. 21.

As indicated by arrows 73 and 74 in FIG. 23, the signal charges of the pixels 62a and 62b are transmitted at a higher transmission rate from time t5 to time t6 in the next frame period (F+1), and are transmitted at a normal transmission rate from time t6 to time t8. The signal charges of the pixels 62a are transmitted to the first horizontal CCD 53, and are further transmitted to the first amplifier 55 and the differential amplifier 57. The signal charges of the pixels 62b are transmitted to the second horizontal CCD 54, and are further transmitted to the second amplifier 56 and the differential amplifier 57.

For example, while transmitting the signal charges of the pixels 62a in the first row via the first horizontal CCD 53, the signal charges of the pixels 62b in the second row are transmitted via the second horizontal CCD 54 at the same timing. On the other hand, while the signal charges of the pixels 62a in the $i^{th}$ row are transmitted via the first horizontal CCD 53, the signal charges of the pixels 62b in the $(i+1)^{th}$ row are transmitted via the second horizontal CCD 54 at the same timing. Therefore, the differential amplifier 57 simultaneously receives the signal charges of a set of the pixels 62a and 62b adjoining each other vertically along the columns of the receiving field via the first and second amplifiers 55 and 56, whereby the difference ($V_{out}$) in signal charge between the pixels 62a and 62b is output. Such an output $V_{out}$ of the differential amplifier 57 is created sequentially for the signal charges of every set of the vertically adjoining pixels 62a and 62b.

While the period from time t6 to time t8, the vertical CCDs 63 of the imaging section 51 and the vertical CCDs 67 of the storage section 52 perform two transmission operations for each of m horizontal scanning periods H in one frame period, so as to perform 2 m transmission operations in total in one frame period, thereby reading out the signal charges of all of the 2 m×n pixels 62a and 62b. The operation performed from time t1 to time t5 is equivalent to the operation performed from t5 to time t9, which is repeated for each frame period.

The signal charges from the pixels 62a is amplified by the first amplifier 55, while the signal charges from the pixels 62b are amplified by the second amplifier 56, with the gain of the first amplifier 55 being set to be twice that of the second amplifier 56. As described above, the storage period of the pixels 62a is ½ of that of the pixels 62b. Therefore, if the image on the receiving field is stationary, whereby the same amount of light is incident upon the pixels 62a and 62b, which are treated as a single sensing unit, the signal charge from the pixel 62a is ½ of the signal charge from the pixel 62b. Thus, the output of the first amplifier 55 having a gain twice that of the second amplifier 56 and the output of the second amplifier 56 are identical to each other, so that the difference obtained by the differential amplifier 57 is zero.

On the other hand, if the image on the receiving field has moved, whereby there is some difference in the amount of incident light between the pixels 62a and 62b, which are treated as a single sensing unit, the signal charge from the pixel 62a is not ½ of the signal charge from the pixel 62b. Thus, the output of the first amplifier 55 having a gain twice that of the second amplifier 56 and the output of the second amplifier 56 are not identical to each other, so that the difference between these outputs is output from the differential amplifier 57, thereby detecting motion of the image.

Figure 24:
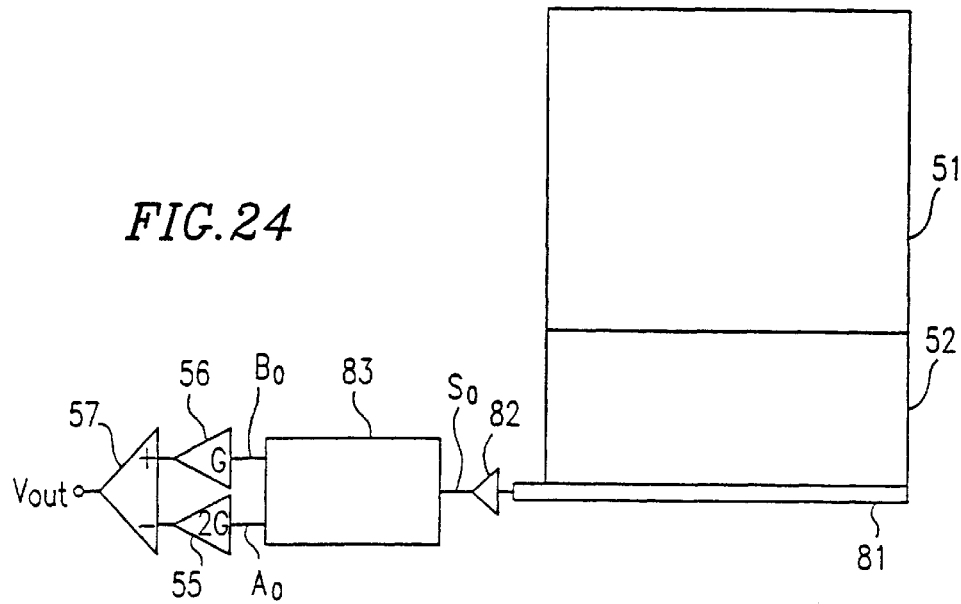
FIG. 24 is a clock diagram showing a solid-state imaging device according to Example 6 of the present invention.

FIG. 24 shows a solid-state imaging device according to Example 6 of the present invention. This solid-state imaging device, as compared to the device shown in FIG. 21, includes one horizontal CCD 81 instead of the first and second horizontal CCDs 53 and 54, but further includes a buffer 82 and a synchronization and time extension circuit 83.

In this example, the operations of the imaging section 51 and the storage section 52 are substantially the same as those of the device shown in FIG. 21. Only the pixels 62a are reset at time t3 in the frame period F so as to drain the signal charges from the pixels 62a. At time t5, all the pixels 62a and 62b are reset, so as to sequentially transmit the signal charges of the pixels 62a and 62b from the vertical CCDs 63 to the vertical CCDs 67 of the storage section 52. Such a transmission operation is repeated 2 m times in one frame period (m is the number of horizontal scanning periods H in one frame period), whereby the signal charges of the pixels 62a in the odd-numbered rows and those in the even-numbered rows are alternately supplied to the horizontal CCD 81 in synchronization with half H/2 of a single horizontal scanning period H.

The signal charges of the pixels 62a in the odd-numbered rows and those in the even-numbered rows are alternately transmitted via the horizontal CCD 81 and further via the buffer 82 to the synchronization and time extension circuit 83. The operation of the synchronization and time extension circuit 83 will be described with reference to FIGS. 25A, 25B and 25C.

Figure 25A:
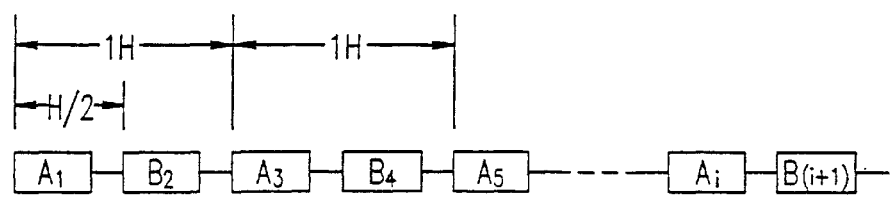
FIGS. 25A, 25B and 25C are a timing diagram illustrating the operation of the solid-state imaging device of FIG. 24.
Figure 25B:
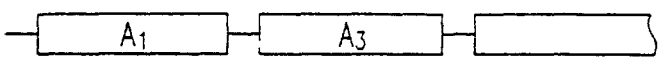
Figure 25C:
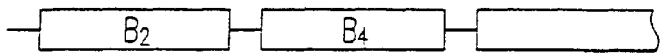

The buffer 82 alternately outputs the signal charge Ai of the pixels 62a in the $i^{th}$ row and the signal charge B(i+1) of the pixels 62b in the $(i+1)^{th}$ row in synchronization with the period H/2 (see FIG. 25A). The synchronization and time extension circuit 83, when receiving both the signal charge Ai of the pixels 62a and the signal charge B(i+1) of the pixels 62b in synchronization with the period H, retards the signal charge Ai by the period H while also retarding the signal charge B(i+1) by the period H/2, so as to synchronize these signal charges Ai and B(i+1) and outputs the signal charges Ai and B(i+1) after extending them by 2-fold. Thus, the synchronization and time extension circuit 83 simultaneously outputs a signal Ao (see FIG. 25B) with a period of H which corresponds to the signal charge Ai and a signal Bo (see FIG. 25C) with a period of H which corresponds to the signal charge B(i+1).

The signals Ao and Bo are amplified respectively by the first amplifier 55 having a gain of 2 G and the second amplifier 56 having a gain of G and then are applied to the differential amplifier 57. The differential amplifier 57 subtracts the signal Ao being doubled from the signal Bo and then outputs the difference ($V_{out}$).

Therefore, as in the device of FIG. 21, when the image has not moved, the output $V_{out}$ of the differential amplifier 57 is substantially zero. When the image has moved, the output $V_{out}$ takes a value other than 0, whereby a signal can be obtained, and the motion of the image can be detected.

Similarly, with the solid-state imaging devices according to Examples 5 and 6, in order to detect motion of the image on the receiving field under an artificial light source, the storage period for the signal charges of the pixels 62a (a period being ½ of the frame period) can be set to a multiple of the period of the light intensity of the artificial light source so as to detect the motion of the image of without an error.

In the solid-state imaging device according to Example 5, as in the device of FIG. 4, the first, second and third transistors 21, 22 and 23 are provided between the first and second CCDs 53 and 54 and the first and second amplifiers 55 and 56. The pixels 62a are not reset during one frame period, but the pixels 62a and 62b are reset by frame periods, and the outputs of the first and second CCDs 53 and 54 are alternately taken out via the first, second and third transistors 21, 22 and 23. In this way, an ordinary video signal can be obtained.

Alternatively, in the solid-state imaging device according to Example 5, it is possible to obtain an ordinary video signal from the buffer 82 by not resetting the pixels 62a during one frame period, but resetting both the pixels 62a and 62b by frame periods.

As described above, in the motion detection solid-state imaging device of the present invention, it is possible to detect motion of an image on the receiving field based on the difference between the signal from the first photoelectric converter being doubled and the signal from the second photoelectric converter for each two frame periods.

In comparison between the device of the present invention and the conventional device, the conventional device requires the signal of the previous frame period to be stored or held in order to obtain the difference between signals respectively of consecutive two frame periods. On the other hand, the device of the present invention performs light integration by the second photoelectric converter for two consecutive frame periods, while performing light integration by the first photoelectric converter only for the latter frame period, and obtains the difference between the signal from the first photoelectric converter being doubled and the signal from the second photoelectric converter. Thus, the device neither requires an external memory nor two different signal charges to be stored in a pixel.

Moreover, the device of the present invention can be easily realized, without increasing the circuit scale while suppressing increases in cost increase. Furthermore, since commonly-used pixels can be used as the pixels of the present invention, pixel size will not increase.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A motion detection solid-state imaging device comprising a plurality of photoelectric converters arranged in a matrix to form a receiving field, the device detecting motion of an image based on signals from the photoelectric converters wherein:

first and second photoelectrics of the plurality of photoelectric converters which are spatially adjacent to each other are treated as a set;

a first light integration period of the first photoelectric converter is shorter than a second light integration period of the second photoelectric converter, while the first and second light integration periods end substantially at a same point of time;

the signals from the first and second photoelectric converters are both read out after the first and second light integration periods; and a product of a ratio of the second light integration period with respect to the first light integration period and the signal from the first photoelectric converter is obtained so as to detect motion of the image based on a difference between the product and a signal from the second photoelectric converter.

2. A motion detection solid-state imaging device according to claim 1, wherein:

the first light integration period is about ½ of the second light integration period, and the ratio of the second light integration period with respect to the first light integration period is about 2; and motion of the image on the receiving field is detected based on a difference between the signal from the first photoelectric converter being approximately doubled and the signal from the second photoelectric converter.

3. A motion detection solid-state imaging device according to claim 1, wherein:

the photoelectric converters arranged in a matrix are divided into sets each including first and second photoelectric converters; and the first and second light integration periods are set individually for each of the sets.

4. A motion detection solid-state imaging device according to claim 1, wherein at least one of the plurality of photoelectric converter performs photoelectric conversion and signal storage.

5. A motion detection solid-state imaging device according to claim 1, wherein at least one of the plurality of photoelectric converter performs photoelectric conversion, signal storage and signal amplification.

6. A motion detection solid-state imaging device according to claim 1, further comprising a correlated double sampling section for compensating the signal from at least one of the plurality of photoelectric converter by subtracting, from the signal read out from at least one photoelectric converter, an output of at least one photoelectric converter after draining a charge from at least one photoelectric converter.

7. A motion detection solid-state imaging device according to claim 1, wherein an optical low-pass filter is provided on the receiving field, the filter having a separation width which corresponds to a separation distance between one set of the first and second photoelectric converters.

8. A motion detection solid-state imaging device, according to claims 1, wherein, when a brightness of an image on the receiving field varies periodically, the first light integration period of the first photoelectric converter is set to a multiple of the period of brightness variation of the image on the receiving field.

9. A motion detection solid-state imaging device, according to claim 1, wherein a detection signal indicating that motion of an image on the receiving field is detected and a signal of each photoelectric converter indicating the image on the receiving field are switchably output.

10. A motion detection solid-state imaging device according to claim 1, wherein:

the first and second light integration periods are initiated by resetting the first and second photoelectric converters and are terminated by reading out the signals of the first and second photoelectric converters; and the reset and readout operations are performed for each horizontal row of the photoelectric converters arranged in a matrix.

11. A motion detection solid-state imaging device according to claim 10, wherein:

for each horizontal row of the photoelectric converters arranged in a matrix, signals are read out and performed by a common readout section; and the first photoelectric converters of the horizontally arranged photoelectric converters are reset by a first reset section, while second photoelectric converters of the horizontally arranged photoelectric converters are reset by a second reset section.

12. A motion detection solid-state imaging device, comprising: a plurality of photoelectric converters arranged in a matrix to form a receiving field; and vertical CCDs provided along each column of the matrix arrangement, signal charges of the photoelectric converters in the column being transmitted and taken out through the vertical CCD of the column by resetting the photoelectric converters arranged in columns, wherein:

a first photoelectric converter and a second photoelectric converter are alternately arranged for each column of the matrix arrangement so as to form the column;

the first photoelectric converter is reset during a second light integration period of the second photoelectric converter so as to initiate a first light integration period of the first photoelectric converter, with the second light integration period of the second photoelectric converter being continued, and the first and second photoelectric converters are both reset at the end of the first and second light integration periods so as to take out the signal charges of the first and second photoelectric converters through the vertical CCD; and a product of a ratio of the second light integration period with respect to the first light integration period and a signal charge of the first photoelectric converter is obtained so as to detect motion of the image based on a difference between the product and a signal charge from the second photoelectric converter.

13. A motion detection solid-state imaging device, according to claim 12, further comprising a first horizontal CCD and a second horizontal CCD, wherein:

signal charges of the first and second photoelectric converters are transmitted to the first and second horizontal CCDs for each column through the vertical CCD of the column; a signal charge of the first photoelectric converter is taken out through the first horizontal CCD; and a signal charge of the second photoelectric converter is taken out through the second horizontal CCD.

14. A motion detection solid-state imaging device, according to claim 12, further comprising a horizontal CCD, wherein:

signal charges of the first and second photoelectric converters are transmitted to the horizontal CCD for each column through the vertical CCD of the column; the signal charges of the first and second photoelectric converters are transmitted alternately through the horizontal CCD; and the signal charges of the first and second photoelectric converters are synchronously taken out by retarding at least one of the signal charges of the first and second photoelectric converters.

15. A motion detection solid-state imaging device, according to claims 12, wherein, when a brightness of an image on the receiving field varies periodically, the first light integration period of the first photoelectric converter is set to a multiple of the period of brightness variation of the image on the receiving field.

16. A motion detection solid-state imaging device, according to claims 15, wherein a detection signal indicating that motion of an image on the receiving field is detected and a signal of each photoelectric converter indicating the image on the receiving field are switchably output.

* * * * *